US012340456B2

(12) United States Patent
Desai et al.

(10) Patent No.: US 12,340,456 B2
(45) **Date of Patent: *Jun. 24, 2025**

(54) DISTRIBUTED PROCESSING IN COMPUTER GENERATED REALITY SYSTEM

(71) Applicant: Apple Inc., Cupertino, CA (US)

(72) Inventors: Ranjit Desai, Cupertino, CA (US); Michael J. Rockwell, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/484,236

(22) Filed: Oct. 10, 2023

(65) Prior Publication Data

US 2024/0112391 A1 Apr. 4, 2024

Related U.S. Application Data

(63) Continuation of application No. 17/652,850, filed on Feb. 28, 2022, now Pat. No. 11,816,776, which is a (Continued)

(51) Int. Cl.
*G06T 15/00* (2011.01)
*G06F 3/147* (2006.01)
*H04L 67/59* (2022.01)

(52) U.S. Cl.
CPC ............ *G06T 15/005* (2013.01); *G06F 3/147* (2013.01); *H04L 67/59* (2022.05); *G06T 2200/16* (2013.01)

(58) Field of Classification Search
CPC ... G06T 19/006; G06T 2200/16; G06T 17/00; G06T 19/20; G06T 2219/024;

(Continued)

(56) References Cited

U.S. PATENT DOCUMENTS 9,158,375 B2 10/2015 Maizels et al.
9,383,582 B2 7/2016 Tang et al.

(Continued)

FOREIGN PATENT DOCUMENTS

CN 107209950 A 9/2017
CN 108431739 A 8/2018
WO 2014105264 7/2014

OTHER PUBLICATIONS

International Search Report and Written Opinion in Appl. No. PCT/US2020/026163 mailed Sep. 16, 2020, 15 pages.

(Continued)

*Primary Examiner* — Hau H Nguyen

(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to display devices. In some embodiments, a display device includes a display system configured to display three-dimensional content to a user. The display device is configured to discover, via a network interface, one or more compute nodes operable to facilitate rendering the three-dimensional content and receive information identifying abilities of the one or more compute nodes to facilitate the rendering. Based on the received information, the display device evaluates a set of tasks to identify one or more of the tasks to offload to the one or more compute nodes for facilitating the rendering and distributes, via the network interface, the identified one or more tasks to the one or more compute nodes for processing by the one or more compute nodes.

20 Claims, 14 Drawing Sheets

Related U.S. Application Data continuation of application No. 16/835,891, filed on Mar. 31, 2020, now Pat. No. 11,302,055.

(60) Provisional application No. 62/872,063, filed on Jul. 9, 2019, provisional application No. 62/827,802, filed on Apr. 1, 2019.

(58) Field of Classification Search
CPC .... G06F 3/011; G06F 9/505; G06F 2209/509; G06F 9/5044; G06F 9/5088; G09G 2354/00; G09G 5/003
See application file for complete search history.

(56) References Cited

U.S. PATENT DOCUMENTS

| | | | |
|---|---|---|---|
| 9,488,488 | B2 | 11/2016 | Waldman |
| 9,685,004 | B2 | 6/2017 | Wang et al. |
| 10,403,022 | B1 | 9/2019 | Silva |
| 10,962,780 | B2 | 3/2021 | Ambrus |
| 2015/0188984 | A1 | 7/2015 | Mullins |
| 2016/0162004 | A1 | 6/2016 | Ljubuncic et al. |
| 2016/0203648 | A1 | 7/2016 | Bilbrey et al. |
| 2016/0238852 | A1 | 8/2016 | Ellsworth et al. |
| 2017/0332149 | A1 | 11/2017 | Veeramani |
| 2018/0157539 | A1 | 6/2018 | Agarwal |
| 2019/0208007 | A1 | 7/2019 | Khalid |

OTHER PUBLICATIONS

Lin et al., "Computation Offloading Toward Edge Computing," Proceedings of the IEEE, vol. 107, No. 8, Aug. 1, 2019, pp. 1584-1607, XP011738430, ISSN: 0018-9219, DOI: 10.11 09/J PROC.2019.2922285 [retrieved on Aug. 6, 2019].

Extended European Search Report in Appl. No. 23190264.4 mailed Jan. 31, 2024, 5 pages.

DISTRIBUTED PROCESSING IN COMPUTER GENERATED REALITY SYSTEM

The present application is a continuation of U.S. application Ser. No. 17/652,850, entitled "DISTRIBUTED PROCESSING IN COMPUTER GENERATED REALITY SYSTEM," filed Feb. 28, 2022, which is a continuation of U.S. application Ser. No. 16/835,891, entitled "DISTRIBUTED PROCESSING IN COMPUTER GENERATED REALITY SYSTEM", filed Mar. 31, 2020, which claims priority to U.S. Provisional App. Nos. 62/872,063, entitled "DISTRIBUTED PROCESSING IN COMPUTER GENERATED REALITY SYSTEM," filed Jul. 9, 2019 and 62/827,802, entitled "DISTRIBUTED PROCESSING IN COMPUTER GENERATED REALITY SYSTEM," filed Apr. 1, 2019; the disclosures of each of the above-referenced applications are incorporated by reference herein in their entireties.

BACKGROUND

Technical Field

This disclosure relates generally to computing systems, and, more specifically, to computer generated reality systems.

Description of the Related Art

Augmented reality (AR), mixed reality (MR), virtual reality (VR), and cross reality (XR) may allow users to interact with an immersive environment having artificial elements such that the user may feel a part of that environment. For example, VR systems may display stereoscopic scenes to users in order to create an illusion of depth, and a computer may adjust the scene content in real-time to provide the illusion of the user moving within the scene. When the user views images through a VR system, the user may thus feel as if they are moving within the scenes from a first-person point of view. Similarly, MR systems may combine computer generated virtual content with real-world images or a real-world view to augment a user's view of the world, or alternatively combines virtual representations of real-world objects with views of a three-dimensional virtual world. The simulated environments of virtual reality and/or the mixed environments of mixed reality may thus provide an interactive user experience for multiple applications.

Figure 1:
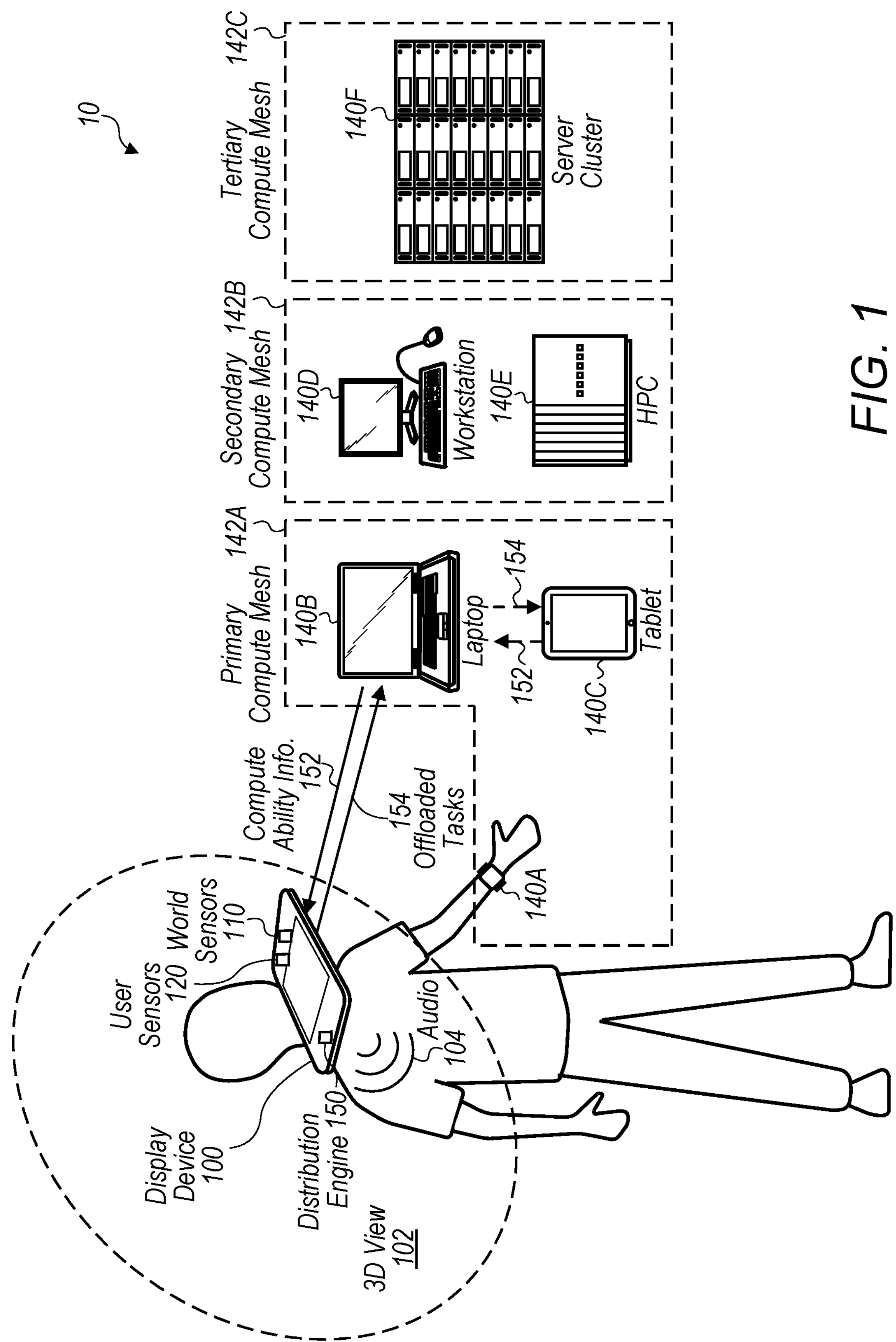
FIG. 1 is a block diagram illustrating an example of a system for distributing processing of content being displayed on a display device among multiple compute nodes.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "display system configured to display three-dimensional content to a user" is intended to cover, for example, a liquid crystal display (LCD) performing this function during operation, even if the LCD in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(*f*) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having eight processing cores, the terms "first" and "second" processing cores can be used to refer to any two of the eight processing cores. In other words, the "first" and "second" processing cores are not limited to processing cores 0 and 1, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, a physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

As used herein, a computer generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer generated audio. In some CGR environments, a person may sense and/or interact only with audio objects.

Examples of CGR include virtual reality and mixed reality.

As used herein, a virtual reality (VR) environment refers to a simulated environment that is designed to be based entirely on computer generated sensory inputs for one or more senses. A VR environment comprises a plurality of virtual objects with which a person may sense and/or interact. For example, computer generated imagery of trees, buildings, and avatars representing people are examples of virtual objects. A person may sense and/or interact with virtual objects in the VR environment through a simulation of the person's presence within the computer generated environment, and/or through a simulation of a subset of the person's physical movements within the computer generated environment.

As used herein, a mixed reality (MR) environment refers to a simulated environment that is designed to incorporate sensory inputs from the physical environment, or a representation thereof, in addition to including computer generated sensory inputs (e.g., virtual objects). On a virtuality continuum, a mixed reality environment is anywhere between, but not including, a wholly physical environment at one end and virtual reality environment at the other end.

In some MR environments, computer generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

As used herein, an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

DETAILED DESCRIPTION

Delivering a great CGR experience (such as an AR, MR, VR, or XR experience) can entail using a considerable amount of hardware and software resources to provide dynamic and vibrant content. The resources available to provide such content, however, operate within limited constraints. For example, a display device may have limited processing ability, operate using a battery supply, and have a network connection with limited bandwidth. Management of these resources can be particularly important for CGR systems as issues, such as jitter and latency, can quickly ruin an experience. For example, it may be difficult for two users to interact within one another if there is a significant delay between events occurring at one user's display device and events occurring at another user's display device.

The present disclosure describes embodiments in which a display device attempts to discover computing devices available to assist the display device and offloads tasks to these computing devices to expand the amount of available computing resources for delivering content. As will be described in greater detail below, in various embodiments, a display device may collect information identifying abilities of the one or more compute devices to assist the display device. For example, the display device may determine that a user has a nearby tablet and laptop that are not currently being used and both have graphics processing units (GPUs). Based on this discovery, the display device may evaluate a set of tasks associated with the content being displayed and may offload one or more tasks to the discovered devices. In various embodiments, the display device may continue to collect compute ability information from available computing devices as operating conditions may change over time. For example, if the display device is communicating wirelessly with a tablet and a user operating the display device walks out of the room, the display device may detect this change and redistribute tasks accordingly. In evaluating what tasks to offload, the display device may consider many factors pertaining to compute resources, energy budgets, quality of service, network bandwidth, security, etc. in an effort to meet various objectives pertaining to, for example, precision, accuracy, fidelity, processing time, power consumption, privacy considerations, etc. Dynamically discovering compute resources and redistributing tasks in real time based on these factors can allow a much richer experience for a user than if the user were confined to the limited resources of the display device and, for example, a desktop computer connected to the display device.

Turning now to FIG. 1, a block diagram of distribution system 10 is depicted. In the illustrated embodiment, distribution system 10 includes a display device 100, which includes world sensors 110, user sensors 120, and a distribution engine 150. As shown, system 10 may further include one or more compute nodes 140A-F. In some embodiments, system 10 may be implemented differently than shown. For example, multiple display devices 100 may be used, more (or fewer) compute nodes 140 may be used, etc.

Display device 100, in various embodiments, is a computing device configured to display content to a user such as a three-dimensional view 102 as well as, in some embodiments, provide audio content 104. In the illustrated embodiment, display device is depicted as phone; however, display device may be any suitable device such as a tablet, television, laptop, workstation, etc. In some embodiments, display device 100 is a head-mounted display (HMD) configured to be worn on the head and to display content to a user. For example, display device 100 may be a headset, helmet, goggles, glasses, a phone inserted into an enclosure, etc. worn by a user. As will be described below with respect to FIG. 5, display device 100 may include a near-eye display system that displays left and right images on screens in front of the user eyes to present 3D view 102 to a user. In other embodiments, device 100 may include projection-based systems, vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), etc. Display device 100 may be used to provide any of various user experiences to a user. In various embodiments, these experiences may leverage AR, MR, VR, or XR environments. For example, display device 100 may provide collaboration and creation experiences, which may allow users to work together creating content in an AR environment. Display device 100 may provide co-presence experiences in which multiple users may personally connect in a MR environment. As used herein, the term "co-presence" refers to a shared CGR experience in which two people can interact with one another using their respective devices. Display device 100 may provide gaming experiences in which a user performs activities in a VR environment. In various embodiments, display device 100 may provide other non-CGR experiences. For example, a user may operate display device 100 to stream a media content such as music or movie, which may be displayed in three or two dimensions. To facilitate delivery of these various experiences, display device 100 may employ the use of world sensors 110 and user sensors 120.

World sensors 110, in various embodiments, are sensors configured to collect various information about the environment in which a user operates display device 100. In some embodiments, world sensors 110 may include one or more visible-light cameras that capture video information of the user's environment. This information may, for example, be used to provide a virtual view of the real environment, detect objects and surfaces in the environment, provide depth information for objects and surfaces in the real environment, provide position (e.g., location and orientation) and motion (e.g., direction and velocity) information for the user in the real environment, etc. In some embodiments, display device 100 may include left and right cameras located on a front surface of the display device 100 at positions that, in embodiments in which display device 100 is an HMD, are substantially in front of each of the user's eyes. In other embodiments, more or fewer cameras may be used in display device 100 and may be positioned at other locations. In some embodiments, world sensors 110 may include one or more world mapping sensors (e.g., infrared (IR) sensors with an IR illumination source, or Light Detection and Ranging (LIDAR) emitters and receivers/detectors) that, for example, capture depth or range information for objects and surfaces in the user's environment. This range information may, for example, be used in conjunction with frames captured by cameras to detect and recognize objects and surfaces in the real-world environment, and to determine locations, distances, and velocities of the objects and surfaces with respect to the user's current position and motion. The range information may also be used in positioning virtual representations of real-world objects to be composited into a virtual environment at correct depths. In some embodiments, the range information may be used in detecting the possibility of collisions with real-world objects and surfaces to redirect a user's walking. In some embodiments, world sensors 110 may include one or more light sensors (e.g., on the front and top of display device 100) that capture lighting information (e.g., direction, color, and intensity) in the user's physical environment. This information, for example, may be used to alter the brightness and/or the color of the display system in display device 100.

User sensors 120, in various embodiments, are sensors configured to collect various information about a user operating display device 100. In some embodiments in which display device 100 is an HMD, user sensors 120 may include one or more head pose sensors (e.g., IR or RGB cameras) that may capture information about the position and/or motion of the user and/or the user's head. The information collected by head pose sensors may, for example, be used in determining how to render and display views of the virtual environment and content within the views. For example, different views of the environment may be rendered based at least in part on the position of the user's head, whether the user is currently walking through the environment, and so on. As another example, the augmented position and/or motion information may be used to composite virtual content into the scene in a fixed position relative to the background view of the environment. In some embodiments there may be two head pose sensors located on a front or top surface of the display device 100; however, in other embodiments, more (or fewer) head-pose sensors may be used and may be positioned at other locations. In some embodiments, user sensors 120 may include one or more eye tracking sensors (e.g., IR cameras with an IR illumination source) that may be used to track position and movement of the user's eyes. In some embodiments, the information collected by the eye tracking sensors may be used to adjust the rendering of images to be displayed, and/or to adjust the display of the images by the display system of the display device 100, based on the direction and angle at which the user's eyes are looking. In some embodiments, the information collected by the eye tracking sensors may be used to match direction of the eyes of an avatar of the user to the direction of the user's eyes. In some embodiments, brightness of the displayed images may be modulated based on the user's pupil dilation as determined by the eye tracking sensors. In some embodiments, user sensors 120 may include one or more eyebrow sensors (e.g., IR cameras with IR illumination) that track expressions of the user's eyebrows/forehead. In some embodiments, user sensors 120 may include one or more lower jaw tracking sensors (e.g., IR cameras with IR illumination) that track expressions of the user's mouth/jaw. For example, in some embodiments, expressions of the brow, mouth, jaw, and eyes captured by sensors 120 may be used to simulate expressions on an avatar of the user in a co-presence experience and/or to selectively render and composite virtual content for viewing by the user based at least in part on the user's reactions to the content displayed by display device 100. In some embodiments, user sensors 120 may include one or more hand sensors (e.g., IR cameras with IR illumination) that track position, movement, and gestures of the user's hands, fingers, and/or arms. For example, in some embodiments, detected position, movement, and gestures of the user's hands, fingers, and/or arms may be used to simulate movement of the hands, fingers, and/or arms of an avatar of the user in a co-presence experience. As another example, the user's detected hand and finger gestures may be used to determine interactions of the user with virtual content in a virtual space, including but not limited to gestures that manipulate virtual objects, gestures that interact with virtual user interface elements displayed in the virtual space, etc.

In various embodiments, display device 100 includes one or network interfaces for establishing a network connection with compute nodes 140. The network connection may be established using any suitable network communication protocol including wireless protocols such as Wi-Fi®, Bluetooth®, Long-Term Evolution™, etc. or wired protocols such as Ethernet, Fibre Channel, Universal Serial Bus™ (USB), etc. In some embodiments, the connection may be implemented according to a proprietary wireless communications technology (e.g., 60 gigahertz (GHz) wireless technology) that provides a highly directional wireless link between the display device 100 and one or more of compute nodes 140. In some embodiments, display device 100 is configured to select between different available network interfaces based on connectivity of the interfaces as well as the particular user experience being delivered by display device 100. For example, if a particular user experience requires a high amount of bandwidth, display device 100 may select a radio supporting the proprietary wireless technology when communicating wirelessly with high performance compute 140E. If, however, a user is merely streaming a movie from laptop 140B, Wi-Fi® may be sufficient and selected by display device 100. In some embodiments, display device 100 may use compression to communicate over the network connection in instances, for example, in which bandwidth is limited.

Compute nodes 140, in various embodiments, are nodes available to assist in producing content used by display device 100 such as facilitating the rendering of 3D view 102. Compute nodes 140 may be or may include any type of computing system or computing device. As shown in FIG. 1, compute nodes 140 may in general may be classified into primary, second, and tertiary compute meshes 142. In the illustrated embodiment, primary compute mesh 142A includes compute nodes 140 belonging to a user of display device 100. These compute nodes 140 may provide less compute ability than compute nodes 140 in other meshes 142, but may be readily available to the user of display device 100. For example, a user operating display device 100 at home may be able to leverage the compute ability of his or her phone, watch 140A, laptop 140B, and/or tablet 140C, which may be in the same room or a nearby room. Other examples of such compute nodes 140 may include wireless speakers, set-top boxes, game consoles, game systems, internet of things (IoT) devices, home network devices, and so on. In the illustrated embodiment, secondary compute mesh 142B includes nearby compute nodes 140, which may provide greater compute ability at greater costs and, in some instances, may be shared by multiple display devices 100. For example, a user operating display device 100 may enter a retail store having a workstation 140D and/or high-performance compute (HPC) device 140E and may be able to receive assistance for such a node 140 in order to interact with store products in an AR environment. In the illustrated embodiment, tertiary compute mesh 142C includes high-performance compute nodes 140 available to a user though cloud-based services. For example, server cluster 140F may be based at a server farm remote from display device 100 and may implement one or more services for display devices 100 such as rendering three-dimensional content, streaming media, storing rendered content, etc. In such an embodiment, compute nodes 140 may also include logical compute nodes such as virtual machines, containers, etc., which may be provided by server cluster 140F.

Accordingly, compute nodes 140 may vary substantially in their abilities to assist display device 100. Some compute nodes 140, such as watch 140A, may have limited processing ability and be power restricted such being limited to a one-watt battery power supply while other nodes, such as server cluster 140F, may have almost unlimited processing ability and few power restrictions such as being capable of delivering multiple kilowatts of compute. In various embodiments, compute nodes 140 may vary in their abilities to perform particular tasks. For example, workstation 140D may execute specialized software such as a VR application capable of providing specialized content. HPC 140E may include specified hardware such as multiple high-performance central processing units (CPUs), graphics processing units (GPUs), image signal processors (ISPs), circuitry supporting neural network engines, secure hardware (e.g., secure element, hardware security module, secure processor, etc.), etc. In some embodiments, compute nodes 140 may vary in their abilities to perform operations securely. For example, tablet 140C may include a secure element configured to securely store and operate on confidential data while workstation 140D may be untrusted and accessible over an unencrypted wireless network connection. In various embodiments, compute nodes 140 may be dynamic in their abilities to assist display device 100. For example, display device 100 may lose connectivity with tablet 140C when a user operating display device 100 walks into another room. Initially being idle, laptop 140B may provide some assistance to display device 100, but provide less or no assistance after someone else begins using laptop 140B for some other purpose.

Distribution engine 150, in various embodiments, is executable to discover compute nodes 140 and determine whether to offload tasks 154 to the discovered compute nodes 140. In the illustrated embodiment, distribution engine 150 make this determination based on compute ability information 152 and the particular tasks 154 being offloaded. Compute ability information 152 may refer generally to any suitable information usable by engine 150 to assess whether tasks 154 should (or should not) be offloaded to particular compute nodes 140. As will be described in greater detail below with respect to FIG. 3, compute ability information 152 may include information about resource utilization, power constraints of a compute node 140, particular hardware or software present at compute nodes 140, the abilities to perform specialized tasks 154, etc. Since the abilities of compute nodes 140 may change over time, in some embodiments, distribution engine 150 may continually receive compute ability information 152 in real time while display device 100 is displaying content. If a particular compute node 140, for example, declines to accept a task 154 or leaves meshes 142, distribution engine 150 may determine to dynamically redistribute tasks 154 among the compute nodes 140 and display device 100.

Distribution engine 150 may evaluate any of various tasks 154 for potential offloading. These tasks 154 may pertain to the rendering of content being displayed on display device 100 such as performing mesh assembly, shading, texturing, transformations, lighting, clipping, rasterization, etc. These tasks 154 may also pertain to the rendering in that they affect what is displayed. For example, as will be discussed below with FIG. 4A, display device 100 may deliver an AR experience that uses an object classifier to identify a particular object captured in video frames collected by a camera sensor 110. Rather than implement the classifier fully at display device 100, distribution engine 150 may offload one or more tasks 154 pertaining the classifier to one or more compute nodes 140. Display device 100 may then indicate the results of the object classification in 3D view 102. Tasks 154 may also pertain to other content being provided by display device 100 such as audio or tactile content being provided to a user. For example, as will be discussed below with FIG. 4B, one or more tasks related to voice recognition may be offloaded to compute nodes 140. Tasks 154 may also pertain to other operations such as storing rendered content for subsequent retrieval by the same display device 100 or other devices such as a friend's phone. Accordingly, tasks 154 performed in the distribution system 10 may be consumed by algorithms/components that produce visual elements (feeding the display), aural elements (e.g. room acoustics) and interaction (e.g. gestures, speech) to meet experience goals. As will be discussed below with respect to FIG. 2, engine 150 may evaluate compute ability information 152 in conjunction with a graph structure defining a set of tasks to be performed, the interdependencies of the tasks, and their respective constraints (e.g., perceptual latencies and thresholds for visual, audio and interaction elements of the experience) as well as one or more user-specific quality of service (QoS) parameters. In various embodiments, engine 150 supplies this information to a cost function that attempts to minimize, for example, power consumption and latency while ensuring that the best user experience is delivered. In some embodiments, distribution engine 150 may also handle collecting results from performance of tasks 154 by nodes 140 and routing the results to the appropriate consuming hardware and/or software in display device 100.

Although depicted within display device 100, distribution engine 150 may reside elsewhere and, in some embodiments, in multiple locations. For example, a first instance of distribution engine 150 may reside at display device 100 and a second instance of distribution engine 150 may reside at laptop 140B. In such an embodiment, the distribution engine 150 at laptop 140B may collect instances of compute ability information 152 from one or more other compute nodes 140, such as tablet 140C as shown in FIG. 1, and provide a set of tasks 154 offloaded from display device 100 to the other compute nodes 140. In some embodiments, the distribution engine 150 at laptop 140B may forward the received compute ability information 152 (or combine it with the compute ability information 152 sent by laptop 140B) on to the distribution engine 150 at display device 100, which may determine what to distribute to the other compute nodes 140. In some embodiments, the distribution engine 150 at laptop 140B may, instead, make the determination locally as to what should be offloaded to the other nodes 140.

Figure 2:
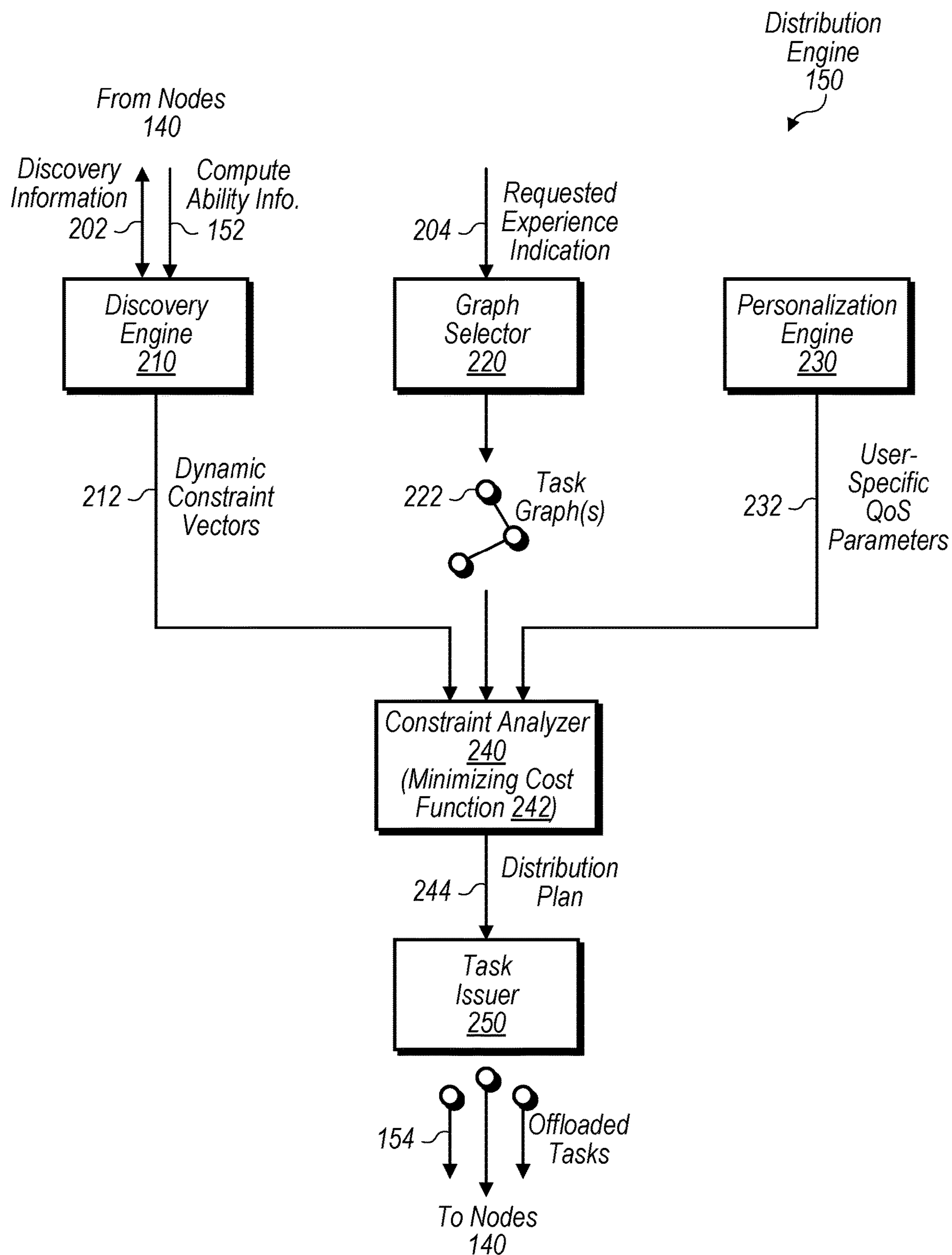
FIG. 2 is a block diagram illustrating an example of a distribution engine operable to distribute tasks among the compute nodes and the display device.

Turning now to FIG. 2, a block diagram of a distribution engine 150 is depicted. In the illustrated embodiment, distribution engine 150 includes a discovery engine 210, graph selector 220, personalization engine 230, constraint analyzer 240, and a task issuer 250. In other embodiments, engine 210 may be implemented differently than shown.

Discovery engine 210, in various embodiments, handles discovery of available compute nodes 140 though exchanging discovery information 202. Discovery engine 210 may use suitable techniques for discovering compute nodes 140. For example, engine 210 may employ a protocol such as simple service discovery protocol (SSDP), Wi-Fi® Aware, zero-configuration networking (zeroconf), etc. As will be described with FIG. 3, engine 210 may send out a broadcast request to compute nodes 140 and/or receive broadcasted notifications from compute nodes 140. In some embodiments, discovery engine 210 also handles collection of compute ability information 152 received from computes nodes 140. In the illustrated embodiment, engine 210 aggregates this information 152 into dynamic constraint vectors 212, which it provides to constraint analyzer 240. As will also be discussed with FIG. 3, constraint vectors 212 may include multiple factors that pertaining to compute nodes' 140 compute ability and are dynamically updated as the state of available compute nodes 140 changes.

Graph selector 220, in various embodiments, identifies a set of tasks 154 for performing a user-requested experience and determines a corresponding task graph 222 for use by constraint analyzer 240. As noted above, display device 100 may support providing multiple different types of user experiences to a user. When a user requests a particular experience (e.g., a co-presence experience between two users), selector 220 may receive a corresponding indication 204 of the request and identify the appropriate set of tasks 154 to facilitate that experience. In doing so, selector 220 may determine one or more task graphs 222. As will be described below with respect to FIGS. 4A and 4B, in various embodiments, task graphs 222 are graph data structures that includes multiple, interdependent graph nodes, each defining a set of constraints for performing a respective one of the set of tasks 154. In some embodiments, selector 220 may dynamically assemble task graphs 222 based on a requested experience indication 204 and one or more contextual factors about the experience. In some embodiments, however, selector 220 may select one or more already created, static task graphs 222.

Personalization engine 230, in various embodiments, produces user-specific QoS parameters 232 pertaining to a particular user's preference or tolerance for a particular quality of service. When a user operates a display device to enjoy a CGR experience, a user may have specific tolerances for factors such as latency, jitter, resolution, frame rate, etc. before the experience becomes unenjoyable. For example, if a user is trying to navigate a three-dimensional space in a VR game, the user may be become dizzy and disoriented if the movement through the space is jittery. Also, one user's tolerance for these factors may vary from another. To ensure that a given user has an enjoyed experience, distribution engine 150 (or some other element of display device 100) may collect user-specific parameters 232 pertaining to a user's preference or tolerance to these user-specific factors. For example, engine 150 may determine, for a given an experience, a minimum frame rate for displaying three-dimensional content, a minimum latency for displaying the three-dimensional content, and a minimum resolution for displaying the three-dimensional content. If engine 150 is unable to distribute a particular set of tasks 154 in a manner that satisfies these requirements, engine 150 may indicate that the experience cannot currently be provided or evaluate a different set of tasks 154 to ensure that parameters 232 can be satisfied. In some embodiments, parameters 232 may be determined by prompting a user for input. For example, display device 100 may present content associated with a particular QoS and ask if it is acceptable to a user. In other embodiments, parameters 232 may be determined as a user experiences a particular QoS and based on sensors 110 and 120. For example, sensors 110 and/or 120 may provide various information indicating that a user is experiencing discomfort, and engine 150 may adjust the QoS of the experience to account for this detected discomfort.

Constraint analyzer 240, in various embodiments, determines how tasks 154 should be distributed among display device 100 and compute nodes 140 based on dynamic constraint vectors 212, task graphs 222, and QoS parameters 232. Accordingly, analyzer 240 may analyze the particular compute abilities of nodes 140 identified in vectors 212 and match those abilities to constraints in task graphs 222 while ensuring that QoS parameters 232 are met. In some embodiments, this matching may include determining multiple different distribution plans 244 for distributing tasks 154 among display device 100 and compute nodes 140 and calculating a cost function 242 for each different distribution plans 244. In various embodiments, cost function 242 is a function (or collection of functions) that determines a particular cost for a given distribution plan 244. The cost of a given plan 244 may be based on any of various factors such as total power consumption for implementing a plan 244, latency for implementing the plan 244, quality of service, etc. Based on the calculated cost functions of the different plans 244, analyzer 240 may select a particular distribution 244 determined to have the least costs (or the highest cost under some threshold amount).

Task issuer 250, in various embodiments, facilitates implementation of the distribution plan 244 selected by constraint analyzer 240. Accordingly, issuer 250 may examine distribution plan 244 to determine that a particular task 154 has been assigned to a particular node 140 and contact that node 140 to request that it perform that assigned task 154. In some embodiments, issuer 250 also handles collecting the appropriate data to perform an assigned task 154 and conveying the data to the node 140. For example, if a given task 154 relies on information from a world sensor 110 and/or user sensor 120 (e.g., images collected by an externally facing camera sensor 110), issuer 250 may assemble this information from the sensor 110 or 120 and communicate this information over a network connection to the compute node 140 assigned the task 154.

Figure 3:
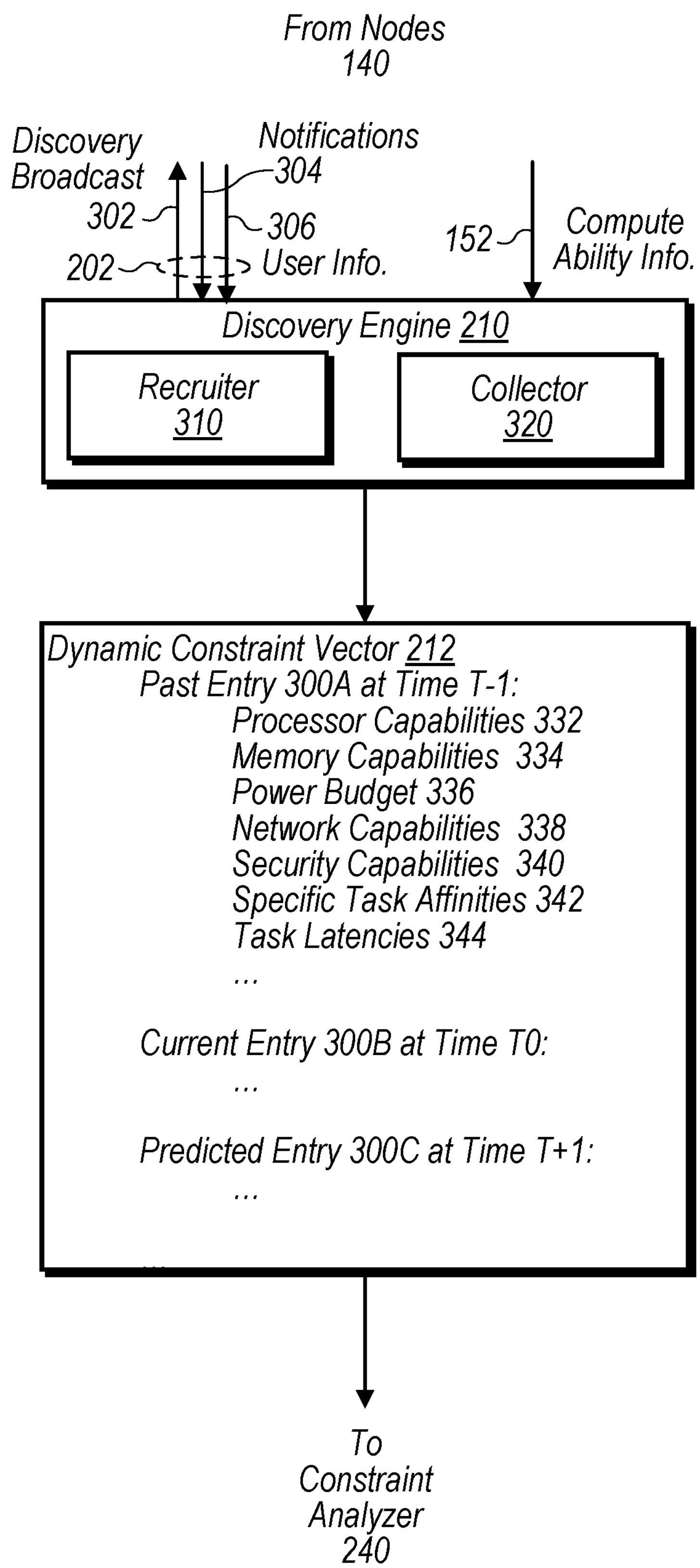
FIG. 3 is a block diagram illustrating an example of a discovery engine that may be included in the distribution engine.

Turning now to FIG. 3, a block diagram of distribution engine 210 is depicted. In the illustrated embodiment, discovery engine 210 includes a recruiter 310 and collector 320. In some embodiments, discovery engine 210 may be implemented differently than shown.

Recruiter 310, in various embodiments, handles discovering and obtaining assistance from compute nodes 140. Although recruiter 310 may use any suitable technique as mentioned above, in the illustrated embodiment, recruiter 310 sends a discovery broadcast 302 soliciting assistance from any available compute nodes 140 and identifies compute nodes 140 based on their responses. As used herein, the term "broadcast" is to be interpreted in accordance with its established meaning and includes a communication directed to more than one recipient. For example, if communication over a network connection is using IPv4, recruiter 310 may send a discovery broadcast 302 to a broadcast address having a host portion consisting of all ones. In various embodiments, discovery broadcast 302 may be conveyed across a local area network accessible to display device 100 in order to identify other nodes 140 a part of the network. In some embodiments, recruiter 310 may receive broadcasted notifications 304 from compute nodes 140. That is, rather responding to any solicitation of recruiter 310, a compute node 140 may send a notification 304 indicating that it is available to assist any display device 100 that happens to need assistance. In some embodiments, recruiter 310 receives additional information about available compute nodes 140 such as user information 306. In various embodiments, compute nodes 140 may provide information 306 about a user (or users) of a compute node 140 so that recruiter 310 can determine whether a compute node is a part of primary mesh 142A discussed above. In such an embodiment, distribution engine 150 may confirm that display device 100 shares the same user as a given compute node 140 (or is using a friend's or family member's compute node 140) before attempting to distribute tasks 154 to that node 140. For example, in some embodiments, compute nodes 140 belonging to primary mesh 142A may indicate that they share a common family account, which may be associated with some service. In response to receive information 306, engine 150 may determine that display device 100 also is associated with the family account in order to identify the compute nodes 140 as being part of primary mesh 142A. In some embodiments, recruiter 310 may also send a request soliciting assistance from server cluster 140F, which may implement a cloud-based service for rendering three-dimensional content as well as providing other services as noted above. In some embodiments, after discovering nodes 140, discovery engine 210 may begin receiving computing ability information 152.

Collector 320, in various embodiments, is executable to compile dynamic constraint vectors 212 and convey them to constraint analyzer 240. In some embodiments, a constraint vector 212 may include information about a single node 140; in other embodiments, a vector 212 may be multi-dimensional and include information 152 from multiple nodes 140. As shown, a given vector 212 may include one or more past entries 300A pertaining to previous compute ability information 152 as well as the current real-time information 152 in an entry 300B. In some embodiments, collector 320 may also analyze current and past information 152 to predict future abilities of compute nodes 140 to facilitate assisting display device 100 as shown in entry 300C. For example, collector 320 may employ a learning algorithm that evaluates past and present information 152 over time. In the illustrated embodiment, a dynamic constraint vector 212 includes processor capabilities 332, memory capabilities 334, power budget 336, network capabilities 338, security capabilities 338, specific task affinities 342, and task latencies 344. In other embodiments, vector 212 may include more (or less) elements than 332-344; aspects described below with respect to one element may also be applicable to others.

Processor capabilities 332, in various embodiments, identify processor information of a given compute node 140. Capabilities 332 may, for example, identify the number of processors, types of processors, operating frequencies, etc. In some embodiments, capabilities 332 may identify the processor utilization of a compute node 140. For example, capabilities 332 may identify that a processor is at 60% utilization. In another embodiment, capabilities 332 may express an amount that a given compute node 140 is willing to allocate to display device 100. For example, capabilities 332 may identify that a given compute node is willing to allocate 10% of its processor utilization.

Memory capabilities 334, in various embodiments, identify memory information of a given compute node 140. Capabilities 334 may, for example, identify the types of memories and their storage capacities. In some embodiments, capabilities 334 may also identify a current utilization of space. For example, capabilities 334 may identify that a compute node 140 is able to store a particular size of data.

Power budget 336, in various embodiments, identifies constraints pertaining to the power consumption of a compute node. For example, in instances when a compute node 140 is using a battery supply, power budget 336 may identify the current charge level of the battery and its total capacity. In instances when a compute node 140 has a plugged-in power supply, power budget 336 may identify the plugged-in aspect along with the wattage being delivered. In some embodiments, power budget 336 may indicate thermal information for a compute node 140. Accordingly, if a given node 140 is operating well below its thermal constraints, it may be able to accommodate a greater number of tasks 154. If, however, a given node 140 is reaching its thermal constraints, tasks 154 may need to be redistributed among other nodes 140 and display device 100.

Network capabilities 338, in various embodiments, include information about a compute node's 140 network interfaces. For example, capabilities 338 may identify the types of network interfaces supported by a given compute node 140 such as Wi-Fi®, Bluetooth®, etc. Capabilities 338 may also indicate the network bandwidth available via the network interfaces, which may be dynamic based on communication channel conditions. Capabilities 338 may also identify the network latencies for communicating with display device 100. For example, capabilities 338 may indicate that an Internet Control Message Protocol (ICMP) echo request takes 20 ms to receive a response.

Security capabilities 340, in various embodiments, include information about a compute node's 140 ability to perform tasks 154 in a secure manner. As noted above, sensors 110 and 120 may collect sensitive information, which may need to be protected to ensure a user's privacy. For example, in supplying an MR experience, a camera sensor 110 may collect images of a user's surroundings. In various embodiments, distribution engine 150 may verify security capabilities 340 before offloading a task 154 that includes processing the images (or some other form of sensitive information). In some embodiments, capabilities 340 may identify a node's 140 ability to process information securely by identifying the presence of particular hardware such as a secure element, biometric authentication sensor, hardware secure module (HSM), secure processor, secure execution environment, etc. In some embodiments, capabilities 340 may provide a signed certificate from a manufacturer of a compute node 140 attesting the secure capabilities of a compute node 140. In some embodiments, the certificate may also attest to other capabilities of a given node 140 such as the presence of particular (as discussed with task affinities 342), an ability to perform a biometric authentication, whether the device includes confidential data of a user, etc. In some embodiments, capabilities 340 may identify whether a secure network connection exists due to the use of encryption or a dedicated physical connection. In some embodiments, capabilities 340 may identify whether a compute node 140 includes a biometric sensor and is configured to perform a biometric authentication of a user.

Specific task affinities 342, in various embodiments, include information about a compute node's 140 ability to handle particular tasks 154. Accordingly, affinities 342 may identify the presence of particular hardware and/or software for performing particular tasks 154. For example, affinities 342 may identify that a given node 140 has a GPU and thus is perhaps more suited for performing three-dimensional rendering tasks 154. As another example, affinities 342 may identify that a given node 140 has a secure element having a user's payment credentials and thus can assist in performing a payment transaction for the user. As yet another example, affinities 342 may identify that a given node 140 supports a neural network engine supporting one or more tasks such as object classification discussed below.

Task Latencies 344, in various embodiments, include information about how long a compute node may take to handle a given task 154. For example, latencies 344 may identify that a particular task 154 is expected to 20 ms based on previous instances in which the compute node 140 performed the task 154 and the current utilizations of the node's 140 resources. In some embodiment, latencies 344 may include network connectivity information discussed above with network capabilities 338 such as a latency of a network connection. In such an embodiment, distribution engine 150 may determine, for example, to not offload a given task 154 if the time taken to offload and perform a task 154 as indicated by task latencies 344 exceeds some threshold.

Figure 4A:
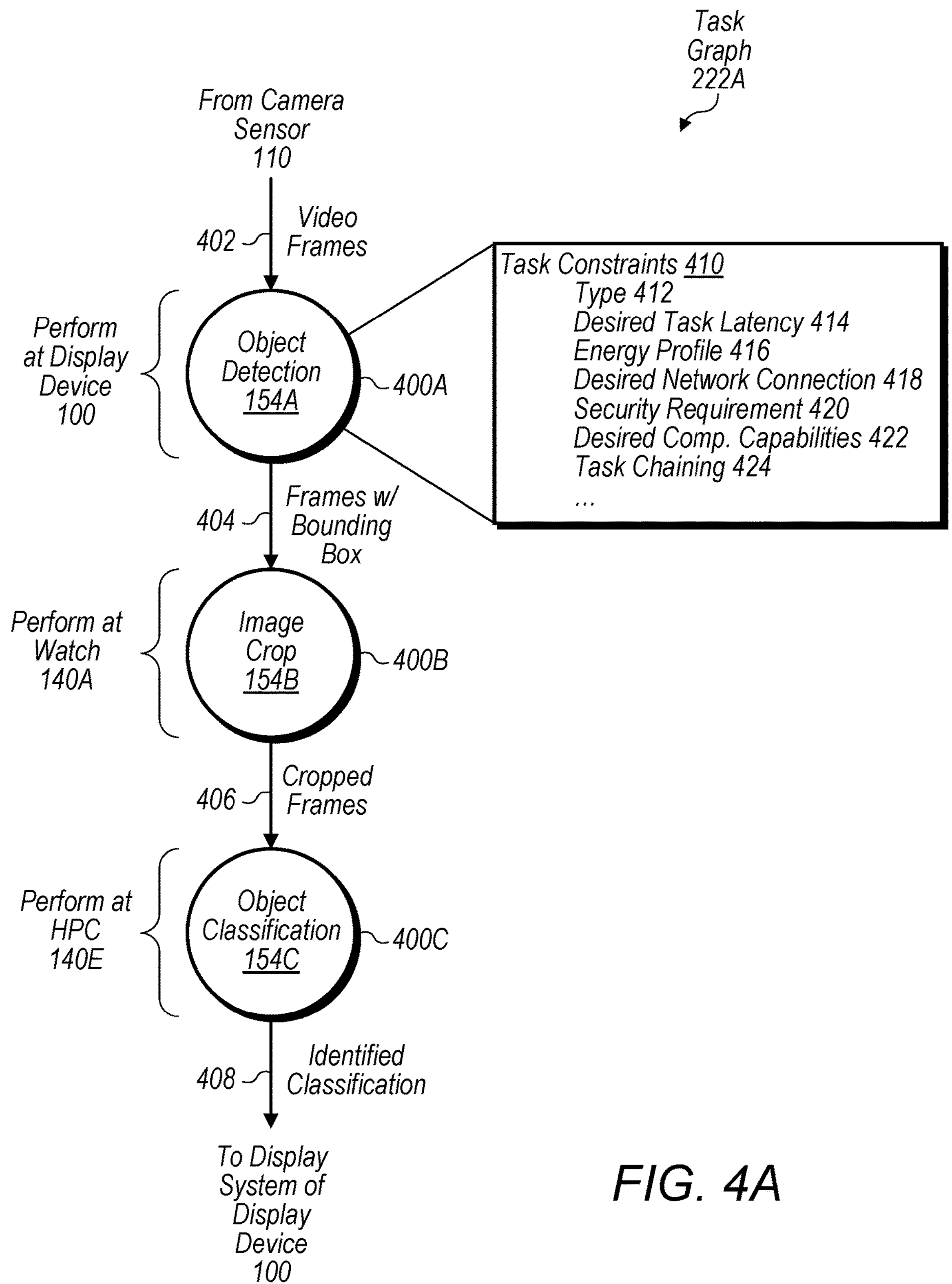
FIGS. 4A-4C are block diagrams illustrating examples of task graphs that may be used by the distribution engine.

Turning now to FIG. 4A, a block diagram of a task graph 222A is depicted. As noted above and shown in FIG. 4A, in various embodiments, a task graph 222 is a graph data structure having multiple nodes 400 corresponding to a set of tasks 154 being considered for offloading. In the illustrated embodiment, task graph 222A is an example of a task graph 222 for a set of tasks 154A-C performed to classify on object present in one or more video frames 402 from a camera sensor 110. For example, a user operating display device 100 may have walked into a store selling a product. When a user looks at the product with display device 100, display device 100 may attempt to classify the object and present AR content about the product being sold. As shown, task graph 222A includes a graph node 400A for an object-detection task 154A in which an object is detected in video frames 402 and a bounding box is placed around the object for subsequent analysis. Task graph 222A then includes a graph node 400B for an image-crop task 154B in which content external to the bounding box is removed from frames 402 to produce cropped frames 406. Lastly, task graph 222A includes a graph node 400C for an object-classification task 154C in which the cropped frames 406 are analyzed to identify the classification 408 of the object in the cropped frames 406—e.g., that the user is looking at a pair of shoes.

As shown, each graph node 400 may define a corresponding set of task constraints 410 for its respective task 154. In the illustrated embodiment, task constraints 410 includes a type 412, desired task latency 414, energy profile 416, desired network connection 418, security requirement 420, desired compute capabilities 422, and task chaining 424. In some embodiments, more (or less) constraints 410 may be defined for a given node 400. Also, constraints defined for one graph node 400 may be different from those defined in another graph node 400.

Type 412, in various embodiments, identifies a type of task 154 associated with a particular node 400. For example, node 400A may indicate its type 412 is object detection while node 400B may indicate its type 412 is image cropping.

Desired task latency 414, in various embodiments, identifies a maximum permissible latency for performing a given task 154. For example, a latency 414 specified in node 400C may indicate that the object-classification task 154 should be completed within 200 ms. Accordingly, if task latencies 344 in vectors 212 indicate that a given compute node 140 cannot satisfy this latency 414, analyzer 240 may preclude the compute node 140 from being considered as a candidate for offloading object-classification task 154C.

Energy profile 416, in various embodiments, indicates an expected energy consumption for performing a given task 154. For example, the profile 416 for node 400A may indicate that object detection is a lesser energy-intensive task 154 while the profile 416 for node 400C may indicate that object classification is a higher energy-intensive task 154. Thus, analyzer 240 may assign task 154A to a more power-restricted compute node 140 or display device 100 while assigning task 154C to a less power-restricted node 140 as indicated, for example, by power budget 336 in a vector 212.

Desired network connection 418, in various embodiments, indicates desired characteristics for a network connection associated with a given task 154. These characteristics may be a type of network connection (e.g., Wi-Fi®, Bluetooth®, etc.), a desired bandwidth for a connection, and/or a desired latency for a network connection. For example, a task 154 requiring a high bandwidth (e.g., streaming media content to display device 100) may indicate a desire for a higher bandwidth connection. Accordingly, analyzer 240 may attempt to match characteristics identified in desired network connection 418 with those identified in network capabilities 338 for compute nodes 140.

Security requirement 420, in various embodiments, indicates a requirement to perform a given task 154 in a secure manner. For example, given the potential for video frames 402 to include sensitive content, each of nodes 400A-C may specify a requirement 420 for tasks 154A-C to performed in a secure manner. Accordingly, analyzer 240 may assign tasks 154A-C to compute nodes 140 based on security capabilities 340 in vectors 212. Other examples of sensitive content may include keychain data, passwords, credit card information, biometric data, user preferences, other forms of personal information. Accordingly, if a particular task 154 is being performed using such information, a security requirement 420 may be set to ensure, for example, that any node 140 handling this information is able to protect using some form of secure hardware such as a secure element, hardware secure module (HSM), secure processor, etc. In various embodiments, security requirement 420 may be important with assigning tasks 154 to a given node 140 and may be continually evaluated by engine 150 as the set of available nodes 140 change. For example, if a first node 140 is handling a task 154 having a security requirement 420 and that node 140 becomes unavailable, display device 100 may determine to discontinue a particular experience if another node 140 cannot be found that can satisfy the requirement 420.

Desired compute capabilities 422, in various embodiments, indicates a desire for a compute node 140 to have particular hardware and/or software handle an offloaded task 154. For example, node 400C may specify hardware (or software) implementing a neural network classifier operable to perform the object-classification task 154C. In some instances, capabilities 422 may include more a general specification (e.g., for general purpose hardware implementing a neural network) or may include a more specific specification (e.g., special-purpose hardware designed specifically to implement a convolution neural network (CNN) for object classification). Accordingly, analyzer 240 may evaluate desired compute capabilities 422 against specific task affinities 342 specified in vectors 212.

Task chaining 424, in various embodiments, indicates that two or more tasks 154 should be grouped together when they are assigned to display device 100 or a compute node 140. For example, although not show in FIG. 4A, the task chaining 424 for node 400A may indicate that task 154A is supposed to performed at the same compute node 140 as task 154B. Thus, analyzer 240 may be restricted from assigning tasks 154A and tasks 154B to different nodes 140. As will be discussed below with FIG. 5, in some embodiments, data for chained-together tasks 154 may be collocated in memory to improve the efficiency of accessing the data and/or its security when performing the tasks 154.

As noted above, after evaluating task graphs 222 in conjunction with dynamic constraint vectors 212 and user-specific QoS parameters 232, constraint analyzer 240 may determine a distribution plan 244 for offloading tasks 154. In some embodiments, the distribution plan 244 may be recorded in nodes 400. For example, analyzer 240 may indicate in node 400A that task 154A has been assigned to display device 100, indicate in node 400B that task 154B has been assigned to watch 140A, and indicate in node 400C that task 154C has been assigned to HPC 140E. In other embodiments, plan 244 may indicated differently—and, in some embodiments, provided separately from task graph 222A.

Figure 4B:
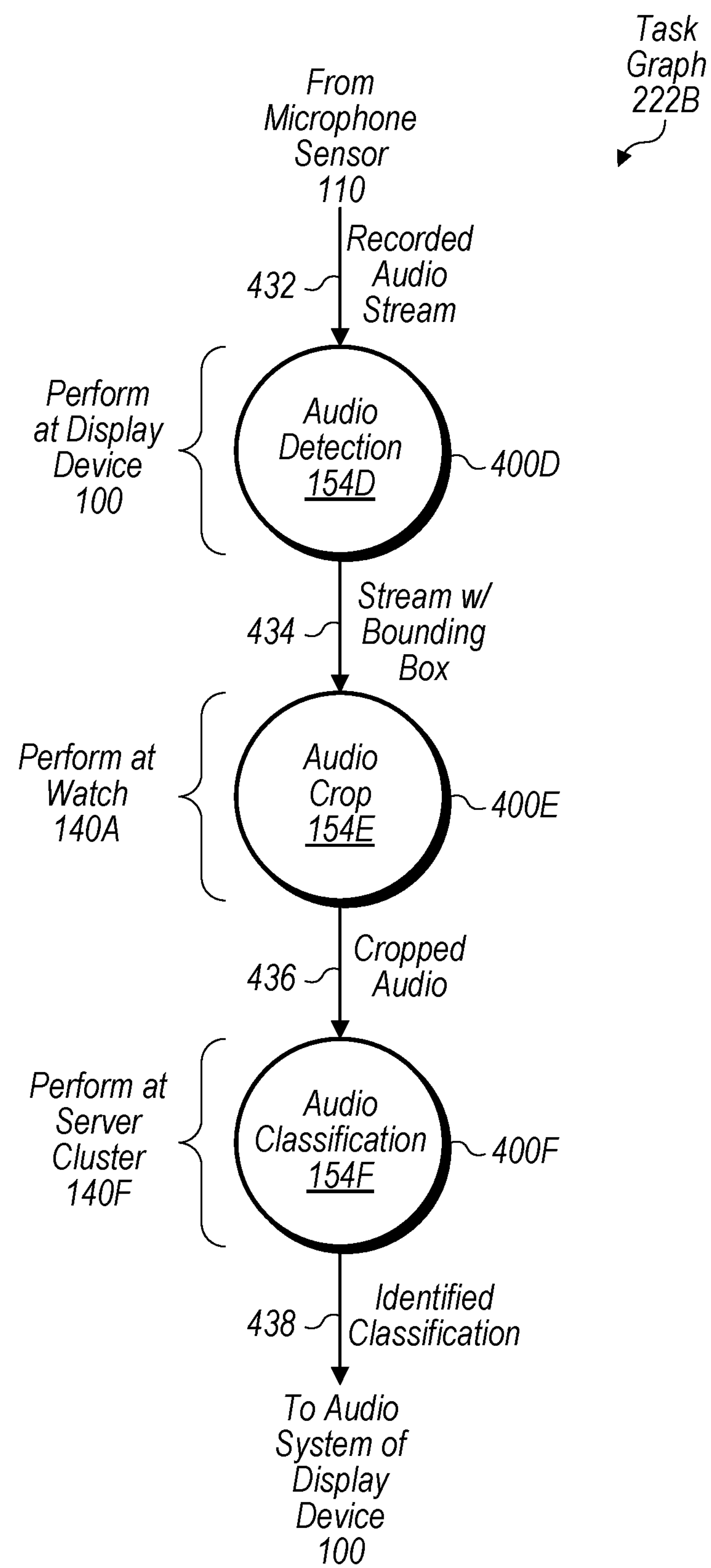

Turning now to FIG. 4B, a block diagram of another task graph 222B is depicted. As noted above, distribution engine 150 may evaluate tasks 154 that pertain to content other than the visual content being presented on display device 100. For example, in the illustrated embodiment, task graph 222B pertains to a set of tasks 154 for performing audio classification, which may be used in voice recognition. As shown, task graph 222B includes a graph node 400D for an audio-detection task 154D in which a recorded audio stream 432 is analyzed for a voice to place a bounding box 434 around the voice. Task graph 222B further includes an audio-cropping task 154E in which the recorded audio 432 is cropped based on the bounding box 434. Task graph 222B then includes a node 400F for an audio-classification task 154F in which the voice in the cropped audio 436 is classified and an indication 438 of the classification is presented—e.g., that a user is asking about the current weather today. Similar to task graph 222A, analyzer 240 may analyze task constraints 410 defined by nodes 400D-400F in conjunction with vectors 212 and parameters 232 in order to determine a distribution plan 244. For example, as shown in FIG. 4B, analyzer 240 has selected a plan 244 that assigns audio-detection task 154D to display device 100, audio-cropping task 154E to watch 140A, and audio-classification task 154F to server cluster 140F. A result of the audio classification may then be presented, for example, via an audio system of display device 100 such as announcing the current weather.

Figure 4C:
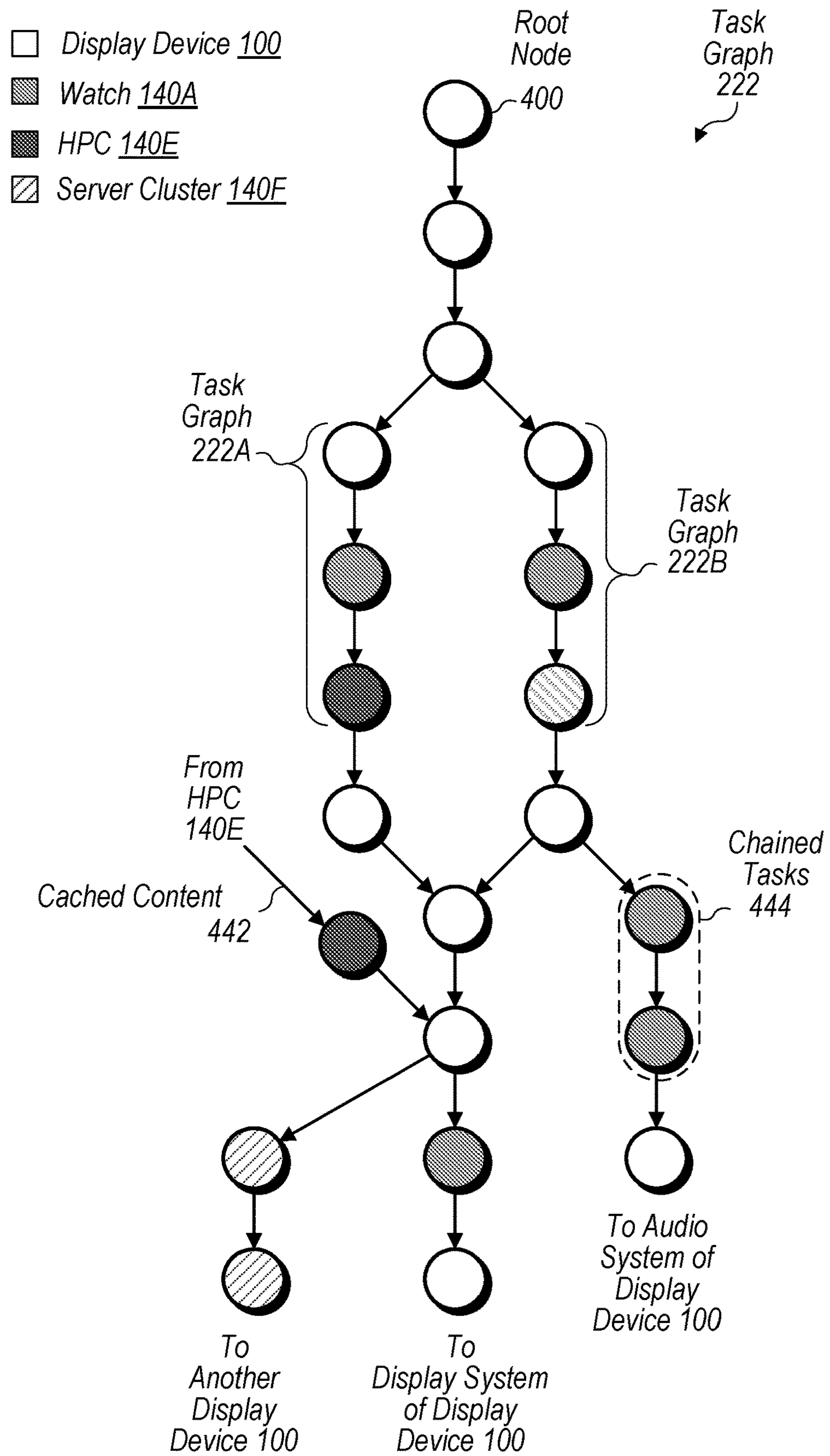

Turning now to FIG. 4C, a block diagram of a larger task graph 222 is depicted. In various embodiments, task graph 222 may be substantially larger than a few nodes 400—even larger, in some embodiments, than the number of nodes 400 depicted in FIG. 4C. In the illustrated embodiment, nodes 400 have been distributed among display device 100, watch 140A, HPC 140E, and server cluster 140F as indicated by the different shades of gray. As shown, graph 222 may begin with a root node 400, which may be selected based on the particular experience requested by the user, and conclude with multiple terminal nodes 400 providing outputs to multiple systems such as another display device 100, a display system of display device 100, an audio system of display device 100, etc. In some embodiments, task graph 222 may be implemented differently than shown—e.g., graph 222 may include more branches of nodes 400, edges of nodes 400 may connect to previous nodes 400 in a manner that forms loops, etc.

In various embodiments, task graph 222 may include nodes 400 that receive inputs from various sources. Accordingly, in the illustrated embodiment, HPC 140E may store cached content 442 that was previously generated and usable to facilitate a subsequent CGR experience. For example, in a museum exhibit depicting a city map having rendered buildings overlaying the map, HPC 140E may cache content 442 generated beforehand to expedite future renderings of the map. In an example discussed below with respect to FIG. 6D, a user may store previously generated content 442 to share it with another device on which the content 442 can be redisplayed.

As mentioned above and shown in FIG. 4C, task graph 222 may also include one or more instances of chained tasks 444 performed at the same compute node 140. For example, in the illustrated embodiments, chained tasks 444 have both been assigned to watch 140A. In some embodiments, chained tasks 444 may be changed based on task chaining parameters 424 specified in a group of nodes 400 as discussed above. In some embodiments, distribution engine 150 may determine that a group of tasks 154 should be chained because they can be more efficiently performed, performed more quickly, consume less power, reduce network traffic, etc. when performed at the same compute node 140.

Figure 5:
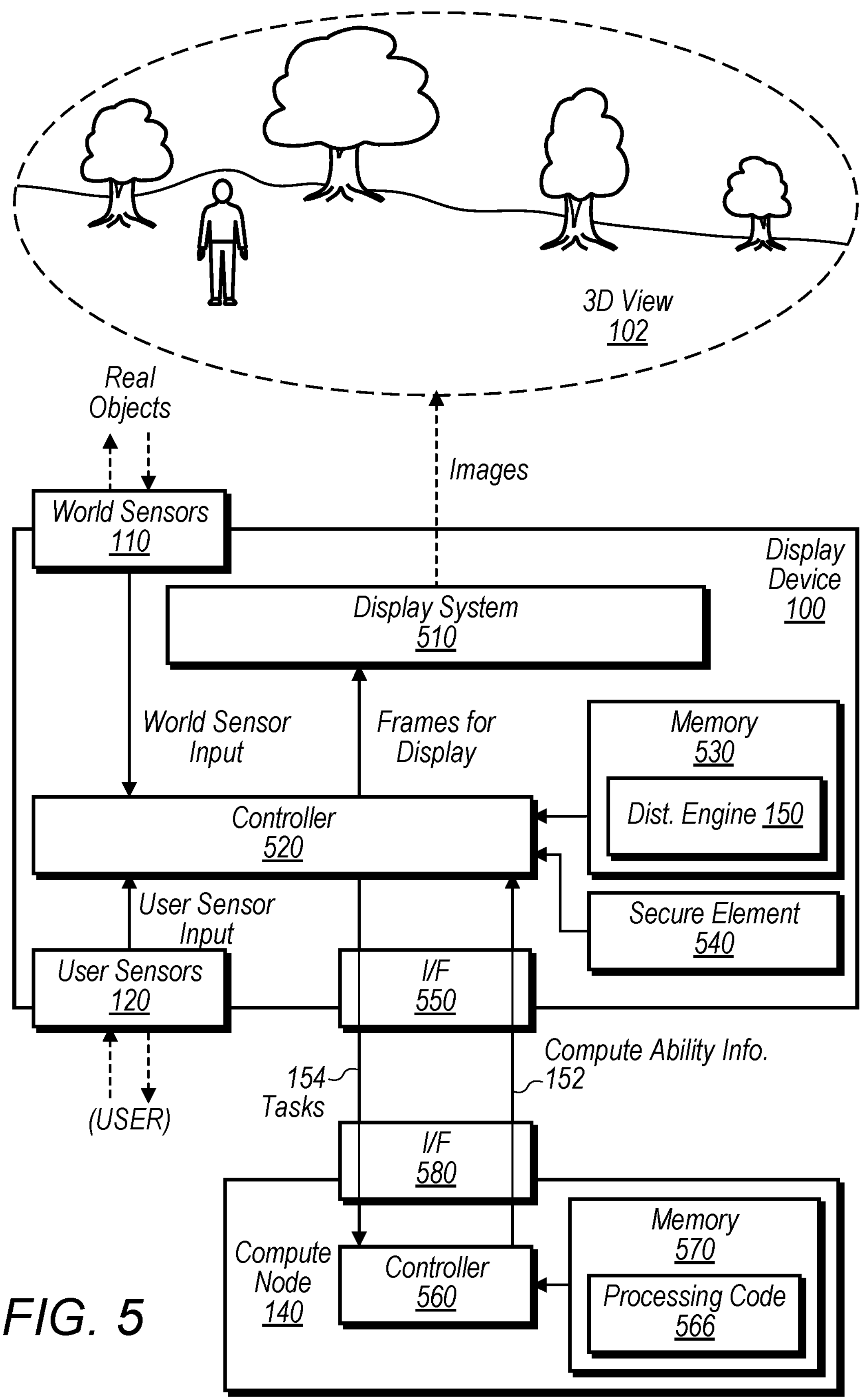
FIG. 5 is a block diagram illustrating an example of components included in the display device and the compute nodes.

Turning now to FIG. 5, a block diagram of components within display device 100 and a compute node 140 is depicted. In the illustrated embodiment, display device 100 includes a display system 510, controller 520, memory 530, secure element 540, and a network interface 550 in addition to world sensors 110 and user sensors 120 discussed above. As shown, a given compute node 140 includes a controller 560, memory 570, and network interface 580. In some embodiments, display device 100 and compute nodes 140 may be implemented differently than shown. For example, display device 100 and/or compute node 140 may include multiple network interfaces 550, display device 100 may not include a secure element 540, compute node 140 may include a secure element 540, etc. In some embodiments, display device 100 and/or compute node 140 may include one or more speakers for presenting audio content 104.

Display system 510, in various embodiments, is configured to display rendered frames to a user. Display 510 may implement any of various types of display technologies. For example, as discussed above, display system 510 may include near-eye displays that present left and right images to create the effect of three-dimensional view 102. In some embodiments, near-eye displays may use digital light processing (DLP), liquid crystal display (LCD), liquid crystal on silicon (LCoS), or light-emitting diode (LED). As another example, display system 510 may include a direct retinal projector that scans frames including left and right images, pixel by pixel, directly to the user's eyes via a reflective surface (e.g., reflective eyeglass lenses). To create a three-dimensional effect in view 102, objects at different depths or distances in the two images are shifted left or right as a function of the triangulation of distance, with nearer objects shifted more than more distant objects. Display system 510 may support any medium such as an optical waveguide, a hologram medium, an optical combiner, an optical reflector, or any combination thereof. In some embodiments, display system 510 may be the transparent or translucent and be configured to become opaque selectively.

Controller 520, in various embodiments, includes circuitry configured to facilitate operation of display device 100. Accordingly, controller 520 may include one or more processors configured to execute program instructions, such as distribution engine 150, to cause display device 100 to perform various operations described herein. These processors may be CPUs configured to implement any suitable instruction set architecture, and may be configured to execute instructions defined in that instruction set architecture. For example, in various embodiments controller 520 may include general-purpose or embedded processors implementing any of a variety of instruction set architectures (ISAs), such as ARM, x86, PowerPC, SPARC, RISC, or MIPS ISAs, or any other suitable ISA. In multiprocessor systems, each of the processors may commonly, but not necessarily, implement the same ISA. Controller 520 may employ any microarchitecture, including scalar, superscalar, pipelined, superpipelined, out of order, in order, speculative, non-speculative, etc., or combinations thereof. Controller 520 may include circuitry to implement microcoding techniques. Controller 520 may include one or more levels of caches, which may employ any size and any configuration (set associative, direct mapped, etc.). In some embodiments, controller 520 may include at least GPU, which may include any suitable graphics processing circuitry. Generally, a GPU may be configured to render objects to be displayed into a frame buffer (e.g., one that includes pixel data for an entire frame). A GPU may include one or more graphics processors that may execute graphics software to perform a part or all of the graphics operation, or hardware acceleration of certain graphics operations. In some embodiments, controller 520 may include one or more other components for processing and rendering video and/or images, for example image signal processors (ISPs), coder/decoders (codecs), etc. In some embodiments, controller 520 may be implemented as a system on a chip (SOC).

Memory 530, in various embodiments, is a non-transitory computer readable medium configured to store data and program instructions executed by processors in controller 520 such as distribution engine 150. Memory 530 may include any type of volatile memory, such as dynamic random-access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. Memory 530 may also be any type of non-volatile memory such as NAND flash memory, NOR flash memory, nano RAM (NRAM), magneto-resistive RAM (MRAM), phase change RAM (PRAM), Racetrack memory, Memristor memory, etc. In some embodiments, one or more memory devices may be coupled onto a circuit board to form memory modules such as single inline memory modules (SIMMs), dual inline memory modules (DIMMs), etc. Alternatively, the devices may be mounted with an integrated circuit implementing system in a chip-on-chip configuration, a package-on-package configuration, or a multi-chip module configuration.

In some embodiments, data pertaining to tasks 154 may be stored in memory 530 based on the particular tasks 154. As noted above, a set of tasks 154 may be chained together to be performed by the same compute node 140 or display device 100. In such an embodiment, data for the set of tasks 154 may be located together in order to expedite access. For example, the data may be collocated in the same physical storage, the same memory pages, a contiguous block of memory addresses, etc. In some embodiments, tasks 154 associated with secure operations may be encrypted and/or stored in a portion of memory 530 having restricted access. For example, this portion of memory 530 may be protected using encryption provided by secure element 540.

Secure element (SE) 540, in various embodiments, is a secure circuit configured perform various secure operations for display device 100. As used herein, the term "secure circuit" refers to a circuit that protects an isolated, internal resource from being directly accessed by an external circuit such as controller 520. This internal resource may be memory that stores sensitive data such as personal information (e.g., biometric information, credit card information, etc.), encryptions keys, random number generator seeds, etc. This internal resource may also be circuitry that performs services/operations associated with sensitive data such as encryption, decryption, generation of digital signatures, etc. For example, SE 540 may maintain one or more cryptographic keys that are used to encrypt data stored in memory 530 in order to improve the security of display device 100. As another example, secure element 540 may also maintain one or more cryptographic keys to establish secure connections, authenticate display device 100 or a user of display device 100, etc. As yet another example, SE 540 may maintain biometric data of a user and be configured to perform a biometric authentication by comparing the maintained biometric data with biometric data collected by one or more of user sensors 120. As used herein, "biometric data" refers to data that uniquely identifies the user among other humans (at least to a high degree of accuracy) based on the user's physical or behavioral characteristics such as fingerprint data, voice-recognition data, facial data, iris-scanning data, etc.

Network interface 550, in various embodiments, includes one or more interfaces configured to communicate with external entities such as compute nodes 140. As noted above, network interface 550 may support any suitable wireless technology such as Wi-Fi®, Bluetooth®, Long-Term Evolution™, etc. or any suitable wired technology such as Ethernet, Fibre Channel, Universal Serial Bus™ (USB) etc. In some embodiments, interface 550 may implement a proprietary wireless communications technology (e.g., 60 gigahertz (GHz) wireless technology) that provides a highly directional wireless connection between the display device 100 and one or more of compute nodes 140.

Controller 560, in various embodiments, includes circuitry configured to facilitate operation of display device 100. Controller 560 may implement any of the functionality described above with respect to controller 520. For example, controller 560 may include one or more processors configured to execute program instructions to cause compute node 140 to perform various operations described herein such as processing code 566 to process offloaded tasks 145.

Memory 570, in various embodiments, is configured to store data and program instructions executed by processors in controller 560. Memory 570 may include any suitable volatile memory and/or non-volatile memory such as those noted above with memory 530. Memory 570 may be implemented in any suitable configuration such as those noted above with memory 530.

Network interface 580, in various embodiments, includes one or more interfaces configured to communicate with external entities such as display device 100 as well as other compute nodes 140. Network interface 580 may also implement any of suitable technology such as those noted above with respect to network interface 550.

Figure 6A:
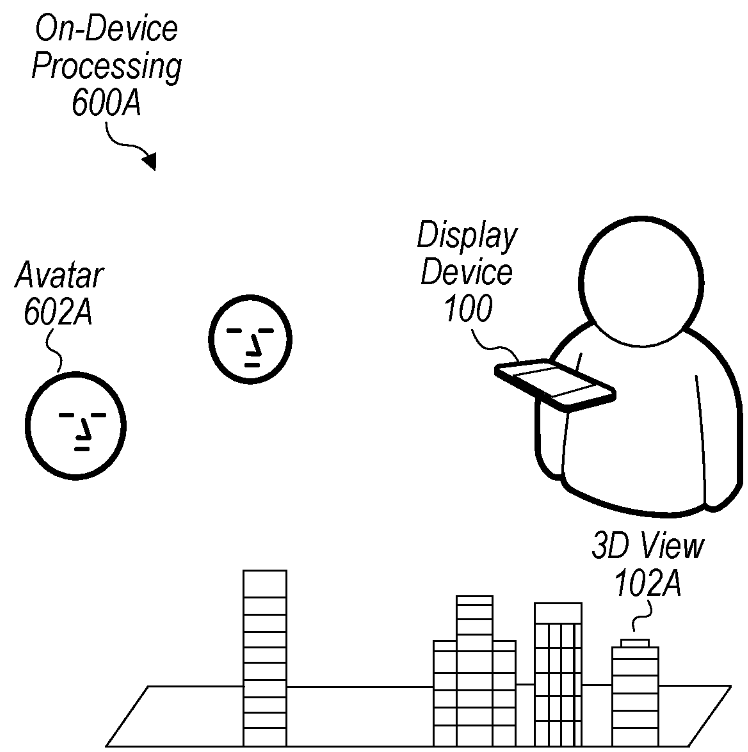
FIGS. 6A-D are diagrams illustrating different examples of processing content being displayed.

Turning now to FIG. 6A, a diagram of on-device processing 600A is depicted. In the illustrated embodiment, on-device processing 600A is an example in which display device 100 is unable to use available compute nodes 140 to assist in presenting a 3D view 102A. In this particular example, a user is participating in a co-presence experience in which the user is viewing some buildings of a city skyline with one or more other users represented using respective avatars 602A. Because display device 100 is limited to its local compute ability, avatars 602A may be depicted as only heads and fewer buildings may be rendered in view 102A.

Figure 6B:
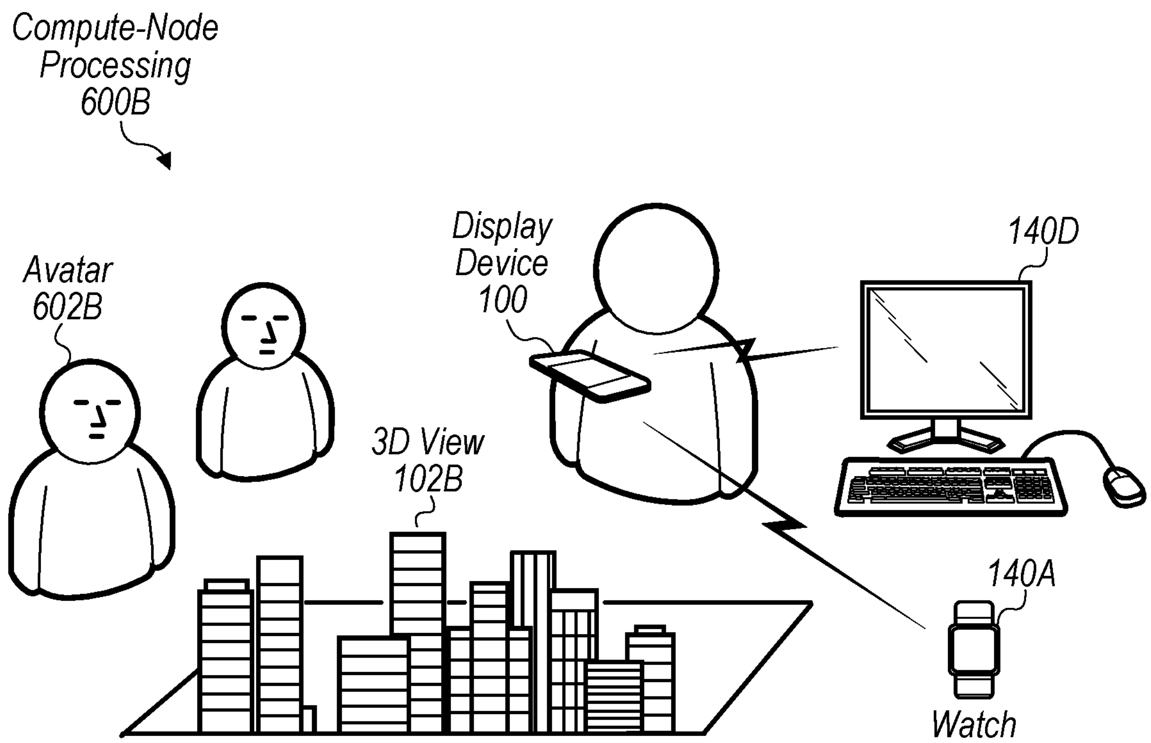

Turning now to FIG. 6B, a diagram of compute-node processing 600B is depicted. In the illustrated embodiment, compute-node processing 600B is an example in which display device 100 is able to leverage the compute ability of other compute nodes 140. In this example, a user may be participating in a similar co-presence experience as discussed above, but display device 100 discovers a nearby watch 140A and workstation 140D and offloads tasks 154 to them. Now, 3D view 102B is rendered in more detail such as including more buildings. Avatars 602B of other participants now have bodies in addition to their heads.

Figure 6C:
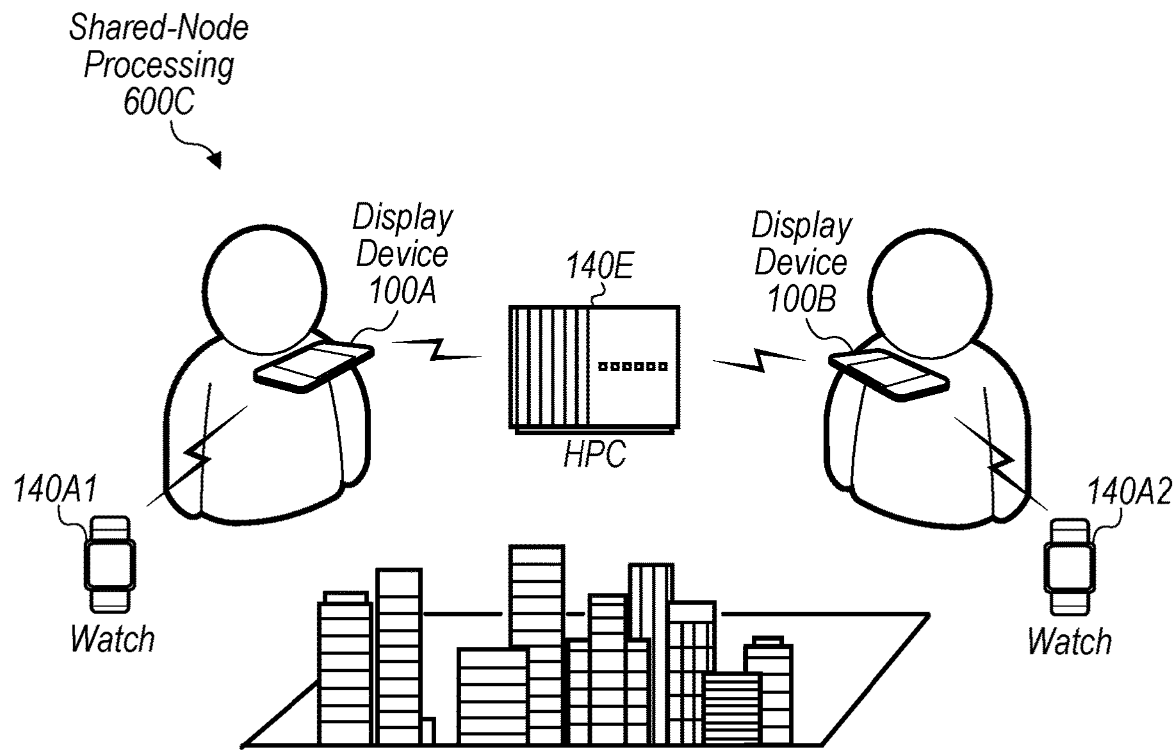

Turning now to FIG. 6C, a diagram of shared-node processing 600C is depicted. As noted above, in some instances, two or more display devices 100 may share a compute node 140. In the illustrated embodiment, shared-node processing 600C is an example of display devices 100A and 100B sharing an HPC 140E, but using separate watches 140A1 and 140A2. For example, both users may be in a museum hosting an MR exhibit in which users view some buildings. To facilitate users with display devices 100A and 100B, the museum may operate an HPC 140E, which display devices 100A and 100B detect when the users enter the exhibit. The HPC 140E may allow display devices 100 to provide more vibrant content than if display devices 100 only used their respective watches 140A. In such an example, HPC 140E may provide first compute ability information 152 to display device 100A and second compute ability information 152 to display device 100B in order to perform one or more tasks offloaded from display device 100A while performing one or more tasks offloaded from the display device 100B. As more display devices 100 discover HPC 140E, it may be become more restricted in its compute abilities and indicate this restriction in subsequent communications of compute ability information 152. As such, display devices 100 may redistribute more tasks 154 to their respective watches 140A. Or alternatively, the user operating display device 100A may walk away from HPC 140E such that the network connection to HPC 140E degrades to the point it can no longer be used, and display device 100A may dynamically redistribute tasks 154 among itself and watch 140A.

Figure 6D:
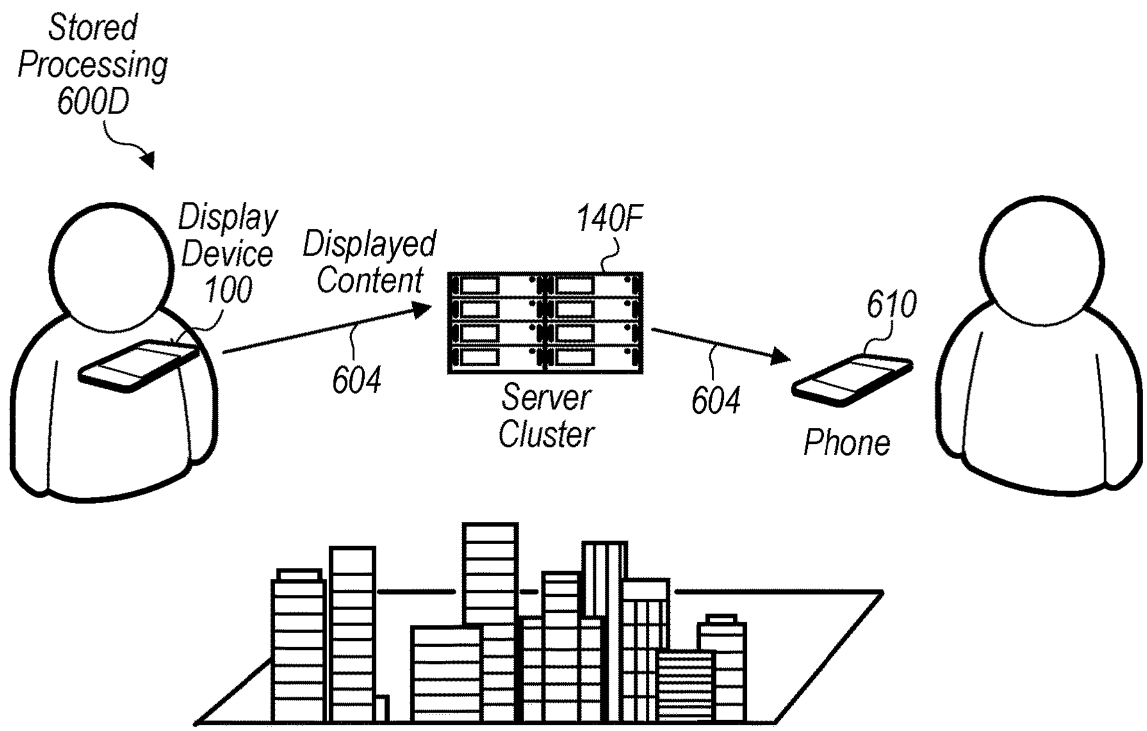

Turning now to FIG. 6D, a diagram of stored processing 600D is depicted. As noted above, a compute node 140 may assist display device 100 by storing content for display device 100. In some embodiments, this content may be used to facilitate subsequent content rendering on display device 100. In some embodiments, this content may be used to facilitate presenting content on other devices, which may include other display devices 100. For example, in the illustrated embodiment, a user operating display device 100 may be viewing displayed content 604 including a three-dimensional mixed reality (MR) environment that includes a collection of buildings rendered on a surface. In some instances, a user may want to share this displayed content 604 for replay on another device such as a friend's phone 610. In response to receiving such a request, display device 100 may request that a compute node 140, such as server cluster 140F, store displayed content 604. In some embodiments, server cluster 140F may then receive a request for displayed content 604 from the phone 610 and provide content 604 to phone 610 for presentation on a display of phone 610.

In some embodiments, content 604 displayed on display device 100 and phone 610 is rendered based on data provided by one or more sensors 110 and/or 120 in the display device. For example, the data may include data collected by a sensor in the display device configured to measure an orientation of device 100 such as a pose of a user's head in an embodiment in which devices 100 is an HMD. Accordingly, as a user operating display device 100 changes the orientation of device 100 such as changing his or her head, displayed content on both display device 100 and phone 610 may be adjusted to reflect the changing view in front of display device 100. As another example, the data may include data collected by an externally facing camera in the display device configured to capture video frames of the environment in which the display device is operated. Accordingly, real-world content included the frames may also be included the content 604 displayed on both display device 100 and phone 610. In various embodiments, server cluster 140F may also receive one or more tasks 154 offloaded from display device 100 to facilitate rendering content for display device 100 in addition to storing displayed content 604. In some embodiments, receiving the one or more tasks may include receiving data collected by one or more sensors 110 and/or 120 and using the received data to perform the one or more offloaded tasks 154.

Figure 7A:
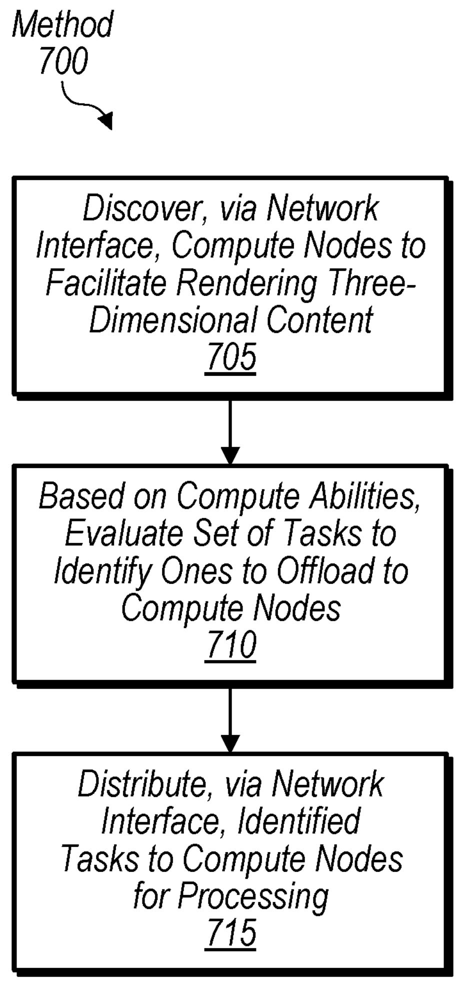
FIG. 7A-D are flow diagram illustrating examples of methods performed by components of the distribution system.

Turning now to FIG. 7A, a flow diagram of a method 700 is depicted. Method 700 is one embodiment of a method that may be performed by a display device such as display device 100 or other examples of devices noted above. In many instances, performance of method 700 (or method 720-770 discussed below) can significantly improve the user experience by expanding the compute available to deliver content to the display device such as AR, MR, VR, or XR content.

In step 705, the display device discovers, via a network interface (e.g., network interface 550), one or more compute nodes (e.g., compute nodes 140) operable to facilitate rendering three-dimensional content displayed on a display system (e.g., display system 510) of the display device. In such an embodiment, the discovering includes receiving information (e.g., compute ability information 152) identifying abilities of the one or more compute nodes to facilitate the rendering. In some embodiments, the display device receives, while the display system is displaying the three-dimensional content, real-time information identifying current abilities of the one or more compute nodes to facilitate the rendering. In various embodiments, the real-time information includes one or more power constraints (e.g., power budget 336) of a compute node facilitating the rendering. In some embodiments, the one or more power constraints (e.g., power budget 336) includes a constraint associated with a battery supplying power to the compute node, a constraint associated with a processor utilization of the compute node, or a thermal constraint of the compute node. In various embodiments, the real-time information includes one or more latency constraints (e.g., network capabilities 338 and task latencies 344) of a compute node facilitating the rendering. In some embodiments, the one or more latency constraints include a latency of a network connection between the compute node and the display device, a bandwidth of the network connection, or a time value identifying an expected time for performing a distributed task at the compute node.

In various embodiments, the discovering includes sending, via the network interface, a request (e.g., discovery engine 210) soliciting assistance of compute nodes for facilitating the rendering and identifies the one or more compute nodes based on responses received from the one or more compute nodes. In some embodiments, identifying the one or more compute nodes includes determining whether the one or more compute nodes share a common user with the display device (e.g., are a part of primary mesh 142A). In some embodiments, the sending includes broadcasting the request (e.g., discovery broadcast 302) across a local area network accessible via the network interface. In some embodiments, the discovering includes sending, via the network interface, a request soliciting assistance from a computer cluster (e.g., server cluster 140F) implementing a cloud-based service for rendering three-dimensional content and disturbing one or more of the set of tasks to the computer cluster.

In step 710, the display device evaluates, based on the received information, a set of tasks (e.g., tasks 154) to identify one or more of the tasks to offload to the one or more compute nodes for facilitating the rendering. In various embodiments, the display device determines a plurality of different distribution plans (e.g., distribution plans 244) for distributing the tasks among the display device and the one or more compute nodes, calculates, based on the received information, a cost function (e.g., cost function 242) for each of the plurality of different distribution plans, and selects, based on the calculated cost functions, one of the plurality of distribution plans for the distributing.

In various embodiments, the display device receives, from the user of the display device, a request to perform a particular operation including displaying the three-dimensional content and, based on the particular operation, determines a graph data structure that includes a plurality of graph nodes, each of the plurality of graph nodes defining a set of constraints for performing a respective one of the set of tasks. In such an embodiment, the evaluating of the set of tasks includes analyzing the graph data structure to determine a distribution plan for the distributing. In some embodiments, one of the plurality of graph nodes specifies a constraint (e.g., desired compute capabilities 422) for using particular hardware to perform one of the set of tasks, and the evaluating includes identifying a compute node having the particular hardware for performing the task. In some embodiment, the particular hardware is a graphics processing unit (GPU). In some embodiments, the display device includes a camera configured to capture images of an environment in which the user operates the display device, the task is classification of an object (e.g., object classification 154C) present in the images, and the particular hardware is hardware implementing a neural network classifier operable to classify the object. In some embodiments, the display device includes a camera configured to capture images of an environment in which the user operates the display device, one of the plurality of graph nodes specifies a constraint (e.g., security requirement 420) for performing a task using the images in a secure manner, and the evaluating includes identifying a compute node operable to perform the task in the secure manner. In some embodiments, the identifying of the compute node includes determining that a network connection between the display device and the compute node is encrypted.

In various embodiments, the display device collects one or more user-specific parameters (e.g., parameters 232) pertaining to the user's tolerance for rendering the three-dimensional content in accordance with a particular quality of service, and the evaluating of the set of tasks is based on the collected one or more user-specific parameters. In some embodiments, the one or more user-specific parameters includes a minimum frame rate for displaying the three-dimensional content, a minimum latency for displaying the three-dimensional content, or a minimum resolution for displaying the three-dimensional content.

In step 715, the display device distributes, via the network interface, the identified one or more tasks to the one or more compute nodes for processing by the one or more compute nodes. In some embodiments, step 715 includes the display device dynamically identifying, based on the real-time information, ones of the tasks for offloading and redistributing the dynamically identified tasks among the display device and the one or more compute nodes. In some embodiments, the display device analyzes the received real-time information to predict future abilities (e.g., predicted entry 300C) of the one or more compute nodes to facilitate the rendering and, based on the predicted future abilities, redistributes the dynamically identified tasks among the display device and the one or more compute nodes.

Figure 7B:
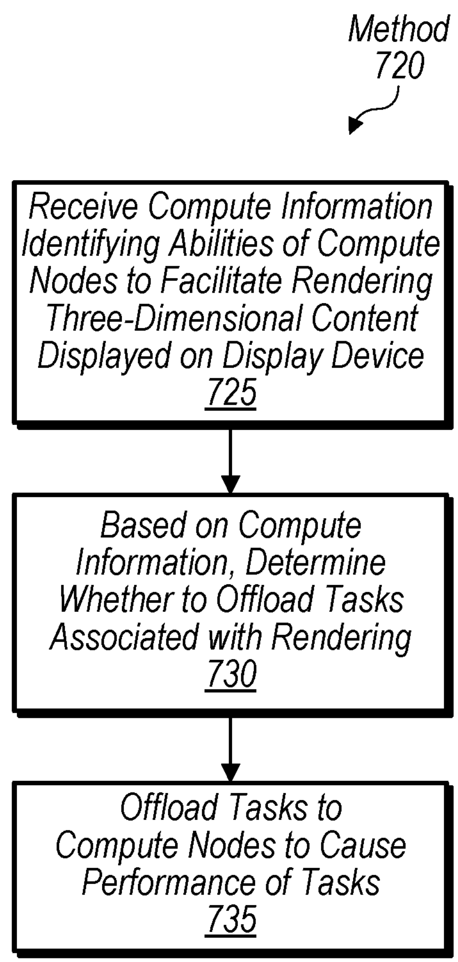

Turning now to FIG. 7B, a flow diagram of a method 720 is depicted. Method 720 is one embodiment of a method that may be performed by a computing device, such as display device 100 or one of compute nodes 140, executing program instructions such as those of distribution engine 150.

In step 725, the computing device receives compute information (e.g., compute ability information 152) identifying abilities of one or more compute nodes to facilitate rendering three-dimensional content (e.g., 3D view 102) displayed on a display device. In some embodiments, the compute information is being continuously received while the three-dimensional content is being displayed on the display device, and the compute information includes (e.g., processor capabilities 332, memory capabilities 334, or network capabilities 338) utilizations for one or more hardware resources included the one or more compute nodes. In some embodiments, prior to receiving the compute information, the computing device discovers the one or more compute nodes by sending a broadcast (e.g., discovery broadcast 302) asking for assistance in rendering the three-dimensional content.

In step 730, the computing device determines, based on the compute information, whether to offload one or more tasks (e.g., tasks 154) associated with the rendering of the three-dimensional content. In some embodiments, the computing device calculates a cost function (e.g., cost function 242) for a plurality of different distribution plans (e.g., distribution plan 244) for distributing the one or more tasks among the one or more compute nodes and, based on the calculating, selects one of the plurality of distribution plans determined to have a lowest power consumption. In some embodiments, the computing device receives, from a user of the display device, an indication (e.g., requested experience indication 204) of a desired experience to be provided to the user and, based on the indication, determines a graph data structure (e.g., task graph 222) having a plurality of graph nodes corresponding to a set of tasks for providing the experience, and the determining whether to offload the one or more tasks includes evaluating parameters (e.g., task constraints 410) specified in the plurality of graph nodes. In some embodiments, one of the plurality of graph nodes identifies a particular task (e.g., type 412) to be performed and identifies particular latency (e.g., desired task latency 414) for performing the task, and the determining whether to offload the one or more tasks includes determining whether a compute node can satisfy the particular latency. In some embodiments, the computing device evaluates a user's interaction with the three-dimensional content to determine a user-specific tolerance (e.g., user-specific QoS parameters) to a latency associated with the rendering and determines whether to offload the one or more tasks based on the determined user-specific tolerance to the latency.

In step 735, the computing device offloads the one or more tasks to the one or more compute nodes to cause the one or more compute nodes to perform the one or more offloaded tasks. In some embodiments, the computing device receives, from a camera attached to the display device, images (e.g., video frames 402) collected from an environment in which the display device is operated and offloads, to a compute node, a task that includes using content of the collected images to produce mixed reality content displayed on the display device.

Figure 7C:
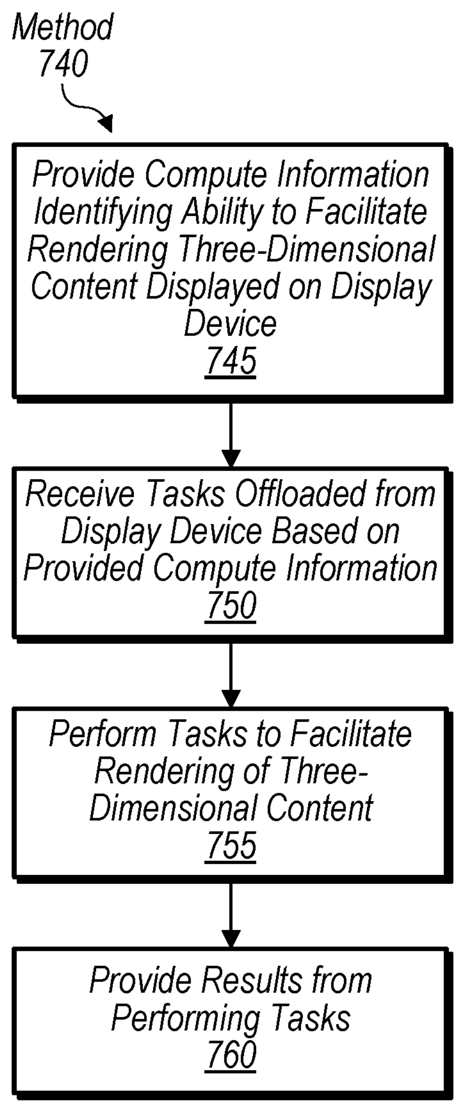

Turning now to FIG. 7C, a flow diagram of a method 740 is depicted. Method 740 is one embodiment of a method that may be performed by a computing device implementing a compute node such as compute node 140.

In step 745, the computing device provides compute information (e.g., compute ability information 152) identifying an ability of the computing device to facilitate rendering three-dimensional content (e.g., 3D view 102) displayed on a display device (e.g., display device 100). In various embodiments, the computing device continuously provides the compute information while the computing device is performing the one or more tasks. In some embodiments, the compute information includes a value (e.g., power budget 336) indicating a current level of a battery supplying power to the computing device. In some embodiments, the compute information includes latency information (e.g., task latencies 344) usable to determine an expected time for the computing device to perform an offloaded task. In some embodiments, the computing device receives a request (e.g., a discovery broadcast 302) to assist in rendering the three-dimensional content and, in response to the request, provides information (e.g., user information 306) about a user of the computing device, the information about the user being usable to determine whether the display device is being used by the same user.

In step 750, the computing device receives one or more tasks (e.g., tasks 154) offloaded from the display device based on the provided compute information. In some embodiments, step 750 includes the computing device receiving image information (e.g., video frames 402, bounding box 404, or cropped frame 406) collected from a camera (e.g., camera sensor 110) embedded in the display device.

In step 755, the computing device performs the one or more tasks to facilitate the rendering of the three-dimensional content. In some embodiments, step 755 includes the computing device processing the received image information to produce content to be mixed with the three-dimensional content to present a mixed reality environment on the display device.

In step 760, the computing device provides results from performing the tasks.

In various embodiments, method 740 further includes the computing device receiving compute information identifying an ability of one or more other computing devices to facilitate rendering the three-dimensional content displayed on a display device and providing a set of tasks offloaded from the display device to the one or more other computing devices. In some embodiments, the computing device provides the received compute information to another computing device configured to determine whether to offload the set of tasks to the one or more other computing devices. In some embodiments, the computing device determines, based on the received compute information, whether to offload the set of tasks to the one or more other computing devices. In some embodiments, the computing device provides first compute information identifying an ability of the computing device to facilitate rendering three-dimensional content displayed on a first display device (e.g., display device 100A in FIG. 6C), provides second compute information identifying an ability of the computing device to facilitate rendering three-dimensional content displayed on a second display device (e.g., display device 100B), and performs one or more tasks offloaded from the first display device while performing one or more tasks offloaded from the second display device.

Figure 7D:
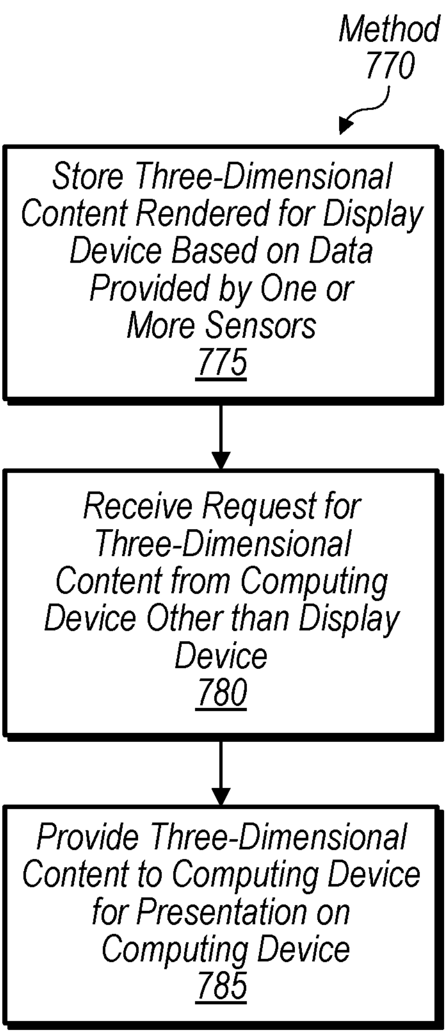

Turning now to FIG. 7D, a flow diagram of method 770 is depicted. Method 770 is one embodiment of a method performed by a computing system, such as system 10 or one of compute nodes 140, to facilitate sharing content of a display device on other devices.

Method 770 begins in step 775 with the computing system storing three-dimensional content (e.g., displayed content 604) rendered for a display device (e.g., display device 100). In various embodiments, the three-dimensional content is rendered based on data provided by one or more sensors (e.g., world sensors 110 or user sensors 120) in the display device. In some embodiments, the three-dimensional content includes mixed reality (MR) content rendered based on an environment in which the display device is operated by a user. In some embodiments, the data includes data collected by a sensor in the display device configured to measure a pose of a user's head. In some embodiments, the data includes data collected by an externally facing camera in the display device configured to capture video frames of the environment in which the display device is operated. In step 780, the computing system receives a request for the three-dimensional content from a computing device (e.g., phone 610) other than the display device. In step 785, the computing system provides the three-dimensional content to the computing device for presentation on a display of the computing device. In various embodiments, method 770 further includes the computing system receiving one or more tasks (e.g., tasks 154) offloaded from the display device to facilitate rendering of the three-dimensional content. In some embodiments, receiving the one or more tasks includes receiving data collected by the one or more sensors and the computing system using the received data to perform the one or more offloaded tasks to facilitate the rendering.

Figure 8:
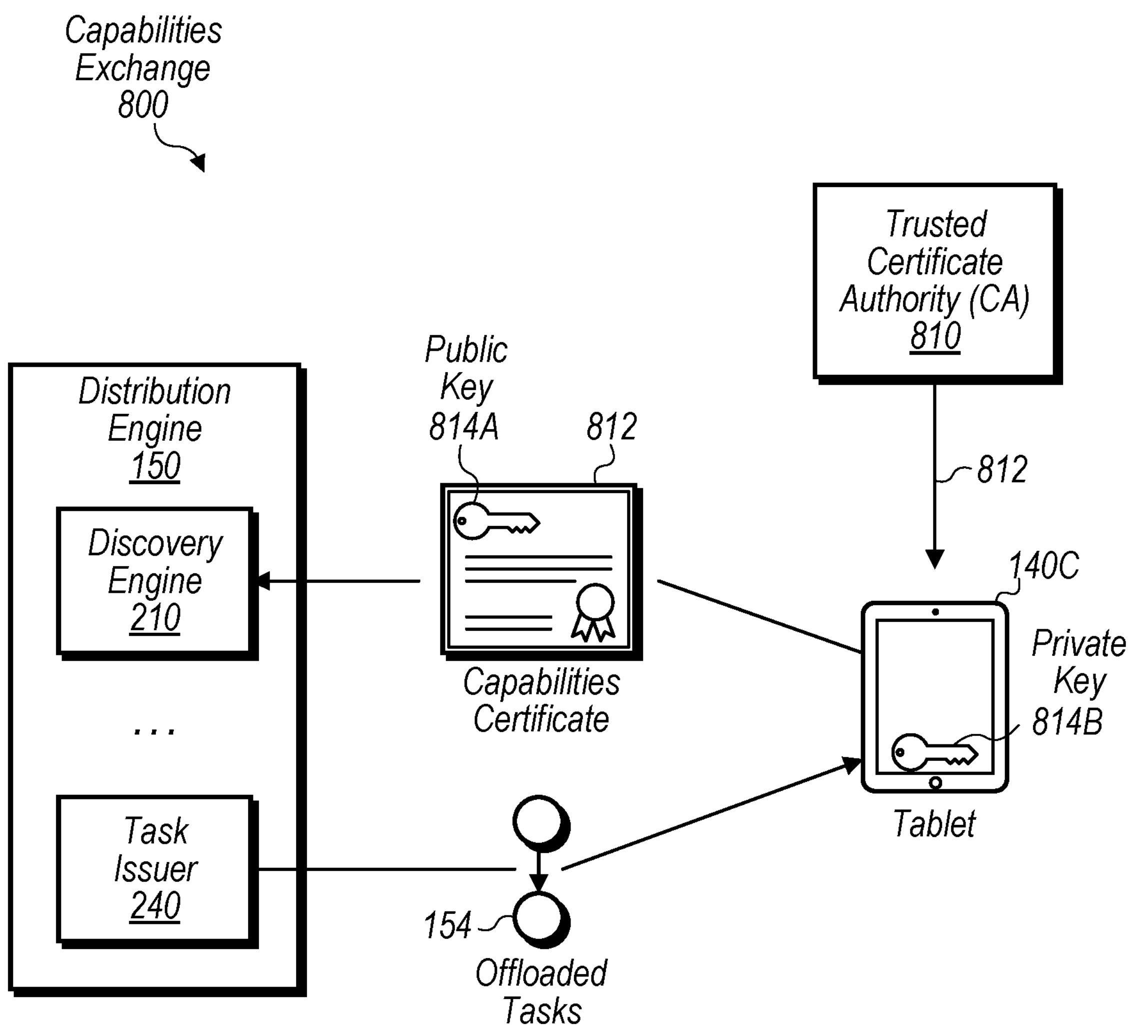
FIG. 8 is a block diagram illustrating an example of the distribution engine assessing the capabilities of a compute node before offloading tasks to it.

Turning now to FIG. 8, a block diagram of a capabilities exchange 800 is depicted. As discussed above, compute nodes 140 may provide compute ability information 152 to distribution engine 150 in order to facilitate determining what tasks 154 should be offloaded. In some embodiments, in order to ensure that this information 152 is accurate, some of this information may be included in a signed attestation provided by a compute node 140. Accordingly, in the illustrated embodiment, a compute node 140 (such as tablet 140C) may contact a trusted certificate authority 820 to obtain a signed certificate 812 attesting to its capabilities and present the certificate 812 to distribution engine 150.

Trusted certificate authority (CA) 810, in various embodiments, is a trusted computing system configured to issue signed certificates 812. In some embodiments, CA 810 may be operated by a manufacturer of display device 100 and/or a compute node 140; however, in other embodiments, CA 810 may be operated by some other trusted entity. In various embodiments, a compute node 140 may obtain a certificate 812 by generating a public-key pair having a public key 814A and a corresponding private key 814B and issuing a certificate signing request (CSR) to CA 810. In some embodiments, the CSR is further signed by a trusted key maintained by a compute node 140 in order to establish trust with CA 810. Such a trusted key, for example, may be stored in a compute node 140 during its manufacturing. In some embodiments, this trusted key may be unique to a given compute node 140 (or, in another embodiment, unique to a particular generation of devices being of the same type—i.e., devices of the same type and generation may store the same key). Once the CSR can be successfully verified, CA 810 may issue a corresponding certificate 812, which may be signed using a trusted private key maintained by CA 810.

Certificate 812 may include any suitable information usable by distribution engine 150 such as one or more of parameters 332-344 discussed above. For example, certificate 812 may specify that a compute node 140 includes secure hardware (e.g., an SE, HSM, secure processor, etc.) as a security capability 340. As another example, certificate 812 may specify a task affinity 342 for performing neural-network related tasks 154 as the compute node 140 may include specialized hardware implementing a neural network engine. In some embodiments, certificate 812 may include manufacturer information attesting to a compute node 140 being a genuine device such as identifying the name of the manufacturer and confirming that the authenticity of the compute node 140 has been verified. Certificate 812 may also include public key 814A, a digital signature generated using private key 814B, and the digital signature of CA 810 mentioned above. In some embodiments, certificate 812 may be X.509 compliant; however, in other embodiments, certificate 812 may be implemented using some other form of signed attestation.

Once certificate 812 has been received, distribution engine 150 may verify certificate 812 to ensure that its authenticity. This may include verifying the signature of CA 810 to ensure the integrity of certificate 812's content. In some embodiments, distribution engine 150 may further authenticate a compute node 140 by issuing a challenge to the compute node 140 to perform a cryptographic operation using private key 814A of the public-key pair and validating a result (e.g., a digital signature) of the cryptographic operation using public key 814A of the public-key pair. If the verification is successful, distribution engine 150 may then attempt to identify tasks 154 having task constraints 410 matching the capabilities identified in certificate 812. In some embodiments, display device 100 may also use public key 814A to establish a secure connection with a compute node 140 such as establishing a shared cryptographic key using an Elliptic-Curve Diffie-Hellman (ECDH) exchange.

Figure 9:
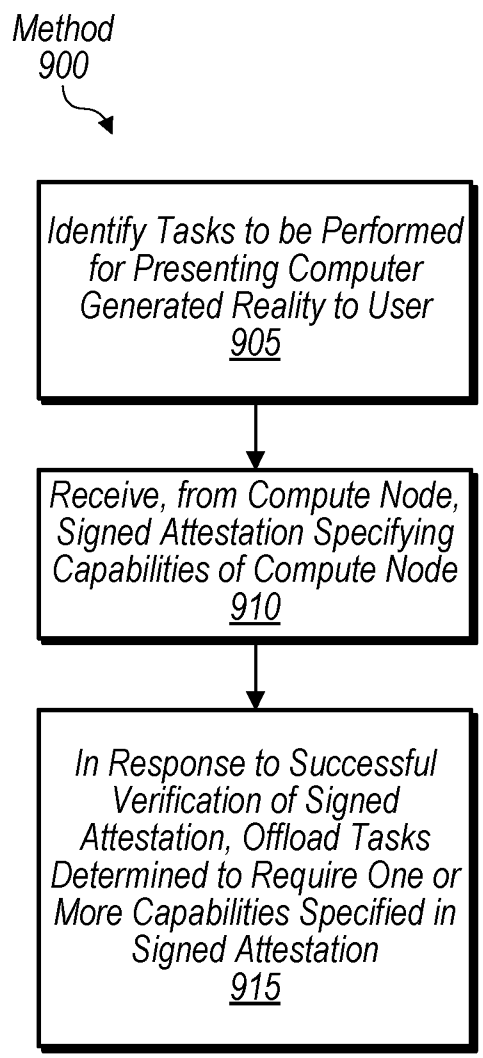
FIG. 9 is a flow diagram illustrating an example of a method for assessing compute node capabilities.

Turning now to FIG. 9, a flow diagram of a method 900 is depicted. Method 900 is one embodiment of a method that may be performed by a computing device such as display device 100 or other examples of devices noted above. In many instances, performance of method 900 can improve security of the computing device when interacting with other compute nodes to present a CGR experience.

In step 905, the computing device identifies a plurality of tasks (e.g., tasks 154) to be performed for presenting a computer generated reality (e.g., 3D view 102) to a user. In various embodiments, the plurality of tasks includes tasks that require particular capabilities to be performed. In some embodiments, step 905 includes evaluating a graph data structure (e.g., task graph 222) having graph nodes corresponding to the plurality of tasks, the graph nodes specifying criteria (e.g., task constraints 410) for performing the plurality of task. In such an embodiment, the computing device determines, from ones of the graph nodes, that the one or more tasks require the one or more capabilities (e.g., based on desired compute capabilities 422).

In step 910, the computing device receives, from a compute node (e.g., compute nodes 140), a signed attestation (e.g., capabilities certificate 812) specifying that the compute node has one or more of the capabilities. In some embodiments, the signed attestation specifies that the compute node includes secure hardware (e.g. secure element 540) configured to cryptographically isolate data operated on during performance of an offloaded task by the compute node. In some embodiments, the signed attestation specifies that the compute node includes a neural network engine usable to perform an offloaded task. In some embodiments, the signed attestation attests to the compute node being a genuine product of a particular manufacturer. In various embodiments, the signed attestation is issued by a certificate authority (e.g., certificate authority 810) in response to a certificate signing request issued by the compute node for a public-key pair generated by the compute node.

In step 915, in response to a successful verification of the signed attestation, the computing device offloads, to the compute node, one or more of the plurality of tasks determined to require the one or more capabilities specified in the signed attestation. In some embodiments, the computing device verifies the signed attestation by issuing a challenge to the compute node to perform a cryptographic operation using a private key (e.g., private key 814B) of the public-key pair and validating a result of the cryptographic operation using a public key (e.g., public key 814A) of the public-key pair.

Figure 10:
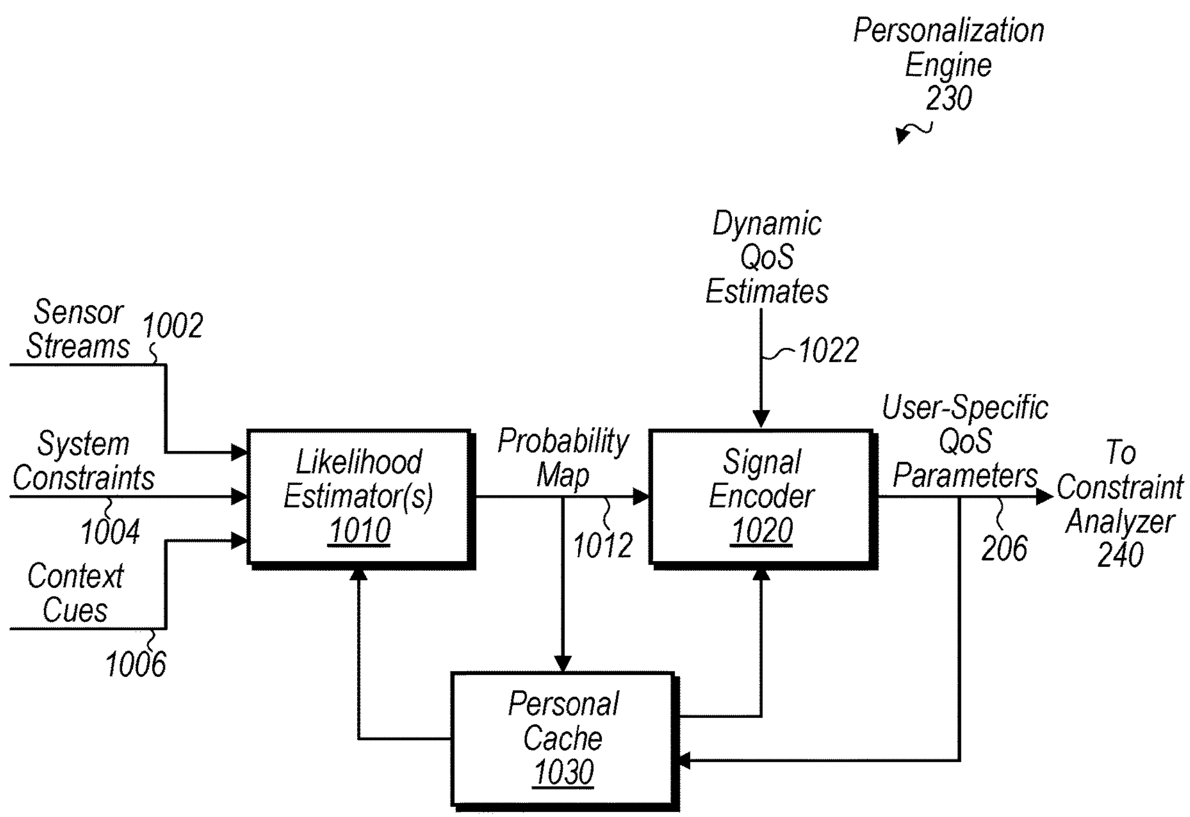
FIG. 10 is a block diagram illustrating an example of a personalization engine.

Turning now to FIG. 10, a block diagram of personalization engine 230 is depicted. As mentioned above, personalization engine 230 may produce user-specific QoS parameters 232 pertaining to a particular user's preference or tolerance for a particular quality of service. In the illustrated embodiment, engine 230 includes one or more likelihood estimators 1010, a signal encoder 1020, and a personal cache 1030. In other embodiments, engine 230 may be implemented differently than shown.

Likelihood estimators 1010, in various embodiments, analyze signals and condition-specific features relevant to the user's experience (e.g., to preserve object shape, enhance audio, smoothing, filtering, compression, etc.). In the illustrated embodiment, estimator 1010 receives sensor streams 1002, system constraints 1004, and context cues 1006. Sensor streams 1002 may contain raw multi-modal sensor data (e.g., from cameras, inertial measurement units (IMUs), audio sensors, or other ones of world sensors 110 and user sensors 120) and computed metadata (e.g., pertaining to statistical properties of signals). System constraints 1004 may contain constrains pertaining to power, compute, latency, or various other constraints discussed above. Context cues 1006 may provide hints about saliency and attributes that may be more relevant such as user context (e.g., content preference, security, privacy, emotional state, health related, audio volume), perceptual tolerance thresholds (e.g. sensing discomfort), safety (e.g., warnings to avoid hazards), etc. Context cues 1006 may also include information about specific locations/zones where display device 100 may be providing particular experiences (e.g., in a store, museum, etc.)—thus, personalization engine 230 may customize/personalize QoS parameters 232 based on delivering curated experiences in specific locations/zones. In the illustrated embodiment, estimators 1010 output probability maps 1012 to signal encoder 1020.

Signal encoder 1020, in various embodiments, uses probability maps 1012 and dynamic QoS estimates 1022 to generate user-specific parameters 206. QoS estimates 1022 may be based on location and network conditions—or other conditions. In various embodiments, parameters 206 may be output as QoS vector values that can be applied to satisfy overall system constraints (e.g., pertaining location, power, latency, bandwidth, fidelity, etc.).

Personal cache 1030, in various embodiments, stores various parameter information, which may be previously determined by likelihood estimator 1010 and signal encoder 1020 and analyzed in subsequent determinations. In the illustrated embodiment, these parameters include previously determined probability maps 1012 and previously determined user-specific QoS parameters 206, which may be combined with other stages (e.g. estimation, training, inference, adaptation). In various embodiments, personal cache 1030 is implemented in a manner that preserves the privacy of stored information as this information may include user-related information.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A display device, comprising:

a display system configured to display content to a user;

a network interface;

one or more processors; and memory having program instructions stored therein that are executable by the one or more processors to cause the display device to perform operations including:

discovering, via the network interface, one or more compute nodes operable to facilitate rendering the content, wherein the discovering includes receiving information identifying abilities of the one or more compute nodes to facilitate the rendering, wherein the information includes one or more of processor capabilities, memory capabilities, a power budget, network capabilities, and security capabilities;

based on the received information, evaluating a set of tasks to identify one or more of the tasks to offload to the one or more compute nodes for facilitating the rendering; and distributing, via the network interface, the identified one or more tasks to the one or more compute nodes for processing by the one or more compute nodes.

2. The display device of claim 1, wherein the operations include:

while the display system is displaying the content:

receiving real-time information identifying current abilities of the one or more compute nodes to facilitate the rendering;

based on the real-time information, dynamically identifying ones of the tasks for offloading; and redistributing the dynamically identified tasks among the display device and the one or more compute nodes.

3. The display device of claim 2, wherein the real-time information includes one or more power constraints of a compute node facilitating the rendering, and wherein the one or more power constraints include a constraint associated with a battery supplying power to the compute node, a constraint associated with a processor utilization of the compute node, or a thermal constraint of the compute node.

4. The display device of claim 2, wherein the real-time information includes one or more latency constraints of a compute node facilitating the rendering, and wherein the one or more latency constraints include a latency of a network connection between the compute node and the display device, a bandwidth of the network connection, or a time value identifying an expected time for performing a distributed task at the compute node.

5. The display device of claim 1, wherein the evaluating includes:

determining a plurality of different distribution plans for distributing the tasks among the display device and the one or more compute nodes;

based on the received information, calculating a cost function for each of the plurality of different distribution plans; and based on the calculated cost functions, selecting one of the plurality of distribution plans for the distributing.

6. The display device of claim 1, wherein the operations include:

receiving, from the user of the display device, a request to perform a particular operation including displaying the content; and based on the particular operation, determining a graph data structure that includes a plurality of graph nodes, wherein each of the plurality of graph nodes defines a set of constraints for performing a respective one of the set of tasks; and wherein the evaluating of the set of tasks includes analyzing the graph data structure to determine a distribution plan for the distributing.

7. The display device of claim 6, further comprising:

a camera configured to capture images of an environment in which the user operates the display device;

wherein one of the plurality of graph nodes specifies a constraint for performing a task using the images in a secure manner; and wherein the evaluating includes identifying a compute node operable to perform the task in the secure manner.

8. The display device of claim 1, wherein the operations include:

collecting one or more user-specific parameters pertaining to the user's tolerance for rendering the content in accordance with a particular quality of service, wherein the one or more user-specific parameters includes a minimum frame rate for displaying the content, a minimum latency for displaying the content, or a minimum resolution for displaying the content; and wherein the evaluating of the set of tasks is based on the collected one or more user-specific parameters.

9. The display device of claim 1, wherein the discovering includes:

sending, via the network interface, a request soliciting assistance of compute nodes for facilitating the rendering; and identifying the one or more compute nodes based on responses received from the one or more compute nodes.

10. The display device of claim 1, wherein the display device is a head-mounted display (HMD).

11. A non-transitory computer readable medium having program instructions stored therein that are executable by a computing device to cause the computing device to perform operations comprising:

receiving compute information identifying abilities of one or more compute nodes to facilitate rendering content displayed on a display device, wherein the information includes one or more of processor capabilities, memory capabilities, a power budget, network capabilities, and security capabilities;

based on the compute information, determining whether to offload one or more tasks associated with the rendering of the content; and offloading the one or more tasks to the one or more compute nodes to cause the one or more compute nodes to perform the one or more offloaded tasks.

12. The non-transitory computer readable medium of claim 11, wherein the compute information is being continuously received while the content is being displayed on the display device, and wherein the compute information includes utilizations for one or more hardware resources included in the one or more compute nodes.

13. The non-transitory computer readable medium of claim 11, wherein the operations comprise:

evaluating a user's interaction with the content to determine a user-specific tolerance to a latency associated with the rendering; and determining whether to offload the one or more tasks based on the determined user-specific tolerance to the latency.

14. The non-transitory computer readable medium of claim 11, wherein the operations comprise:

receiving, from a user of the display device, an indication of a desired experience to be provided to the user; and based on the indication, determining a graph data structure having a plurality of graph nodes corresponding to a set of tasks for providing the experience; and wherein the determining whether to offload the one or more tasks includes evaluating parameters specified in the plurality of graph nodes.

15. The non-transitory computer readable medium of claim 11, wherein the computing device is a compute node configured to facilitate rendering of the content for the display device.

16. The non-transitory computer readable medium of claim 11, wherein the computing device is the display device.

17. A method, comprising:

providing, by a computing device, compute information identifying an ability of the computing device to facilitate rendering content displayed on a display device, wherein the compute information includes one or more of processor capabilities, memory capabilities, a power budget, network capabilities, and security capabilities;

receiving, by the computing device, one or more tasks offloaded from the display device based on the provided compute information;

performing, by the computing device, the one or more tasks to facilitate the rendering of the content; and providing, by the computing device, results from performing the tasks.

18. The method of claim 17, further comprising:

continuously providing, by the computing device, the compute information while the computing device is performing the one or more tasks.

19. The method of claim 17, further comprising:

receiving, by the computing device, a request to assist in rendering the content; and in response to the request, the computing device providing information about a user of the computing device, wherein the information about the user is usable to determine whether the display device is being used by the same user.

20. The method of claim 17, further comprising:

providing, by the computing device, first compute information identifying an ability of the computing device to facilitate rendering content displayed on a first display device;

providing, by the computing device, second compute information identifying an ability of the computing device to facilitate rendering content displayed on a second display device; and performing, by the computing device, one or more tasks offloaded from the first display device while performing one or more tasks offloaded from the second display device.

* * * * *